(12) United States Patent
Starks et al.

(10) Patent No.: US 9,146,765 B2
(45) Date of Patent: Sep. 29, 2015

(54) VIRTUAL DISK STORAGE TECHNIQUES

(75) Inventors: John A. Starks, Seattle, WA (US);
Dustin L. Green, Redmond, WA (US);
Todd William Harris, Sammamish, WA (US); Mathew John, Redmond, WA (US); Senthil Rajaram, Seattle, WA (US); Karan Mehra, Sammamish, WA (US); Neal R. Christiansen, Bellevue, WA (US); Chung Lang Dai, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 550 days.

(21) Appl. No.: 13/046,617

(22) Filed: Mar. 11, 2011

(65) Prior Publication Data

US 2012/0233434 A1 Sep. 13, 2012

(51) Int. Cl.
| | |
|---|---|
| *G06F 12/02* | (2006.01) |
| *G06F 9/455* | (2006.01) |
| *G06F 3/06* | (2006.01) |
| *G06F 17/30* | (2006.01) |

(52) U.S. Cl.
CPC ............ *G06F 9/45558* (2013.01); *G06F 3/061* (2013.01); *G06F 3/0644* (2013.01); *G06F 3/0664* (2013.01); *G06F 3/0689* (2013.01); *G06F 17/30233* (2013.01); *G06F 2009/45579* (2013.01)

(58) Field of Classification Search
CPC ..................................................... G06F 3/0665
See application file for complete search history.

(56) References Cited

U.S. PATENT DOCUMENTS

| | | | |
|---|---|---|---|
| 5,043,866 A | 8/1991 | Myre, Jr. et al. |
| 5,355,477 A | 10/1994 | Strickland et al. |
| 5,528,594 A | 6/1996 | Butter et al. |
| 5,668,958 A | 9/1997 | Bendert et al. |
| 5,678,021 A | 10/1997 | Pawate et al. |
| 6,141,705 A | 10/2000 | Anand et al. |
| 6,161,145 A | 12/2000 | Bainbridge et al. |

(Continued)

FOREIGN PATENT DOCUMENTS

| | | |
|---|---|---|
| CN | 100343793 C | 10/2007 |
| CN | 101278270 A | 10/2008 |

(Continued)

OTHER PUBLICATIONS

"Troubleshooting Parent Virtual Disk Errors in Fusion", http:--kb.vmware.com-selfservice-microsites-search.do?language=en_US&cmd=displayKC&externalId=1018832, accessed Feb. 23, 2011, 1-7.

(Continued)

*Primary Examiner* — Charles Rones
*Assistant Examiner* — Ryan Dare
(74) *Attorney, Agent, or Firm* — Henry Gabryjelski; Kate Drakos; Micky Minhas

(57) ABSTRACT

This document describes techniques for storing virtual disk payload data. In an exemplary configuration, each virtual disk extent can be associated with state information that indicates whether the virtual disk extent is described by a virtual disk file. Under certain conditions the space used to describe a virtual disk extent can be reclaimed and state information can be used to determine how read and/or write operations directed to the virtual disk extent are handled. In addition to the foregoing, other techniques are described in the claims, figures, and detailed description of this document.

20 Claims, 18 Drawing Sheets

(56) References Cited

U.S. PATENT DOCUMENTS

| | | |
|---|---|---|
| 6,275,867 B1 | 8/2001 | Bendert et al. |
| 6,304,983 B1 | 10/2001 | Lee et al. |
| 6,385,701 B1 | 5/2002 | Krein et al. |
| 6,434,620 B1 | 8/2002 | Boucher et al. |
| 6,697,881 B2 | 2/2004 | Cochran |
| 6,785,743 B1 | 8/2004 | Sun et al. |
| 7,016,982 B2 | 3/2006 | Basham |
| 7,107,385 B2 | 9/2006 | Rajan et al. |
| 7,275,139 B1 | 9/2007 | Tormasov et al. |
| 7,373,548 B2 | 5/2008 | Reinhardt et al. |
| 7,383,405 B2 | 6/2008 | Vega et al. |
| 1,740,650 A1 | 7/2008 | Szeto et al. |
| 7,475,167 B2 | 1/2009 | Wunderlich et al. |
| 7,475,199 B1 | 1/2009 | Bobbitt |
| 7,565,526 B1 | 7/2009 | Shaw et al. |
| 7,567,985 B1 | 7/2009 | Comay et al. |
| 7,613,786 B2 | 11/2009 | Nakamura et al. |
| 7,633,955 B1 | 12/2009 | Saraiya et al. |
| 7,676,607 B2 | 3/2010 | Jung et al. |
| 7,694,105 B2 | 4/2010 | Sanvido |
| 7,730,034 B1 | 6/2010 | Deflaux et al. |
| 7,730,231 B2 | 6/2010 | Weisser et al. |
| 7,801,852 B2 | 9/2010 | Wong et al. |
| 7,804,862 B1 | 9/2010 | Olson et al. |
| 7,814,058 B2 | 10/2010 | Beck |
| 7,831,720 B1 | 11/2010 | Noureddine et al. |
| 7,886,115 B2 | 2/2011 | Sanvido et al. |
| 7,890,717 B2 | 2/2011 | Tsuboki et al. |
| 7,895,445 B1 | 2/2011 | Albanese |
| 8,042,163 B1 | 10/2011 | Karr et al. |
| 8,082,231 B1 | 12/2011 | McDaniel et al. |
| 8,086,585 B1 | 12/2011 | Brashers et al. |
| 8,213,583 B2 | 7/2012 | Finogenov |
| 8,239,674 B2 | 8/2012 | Lee et al. |
| 8,250,267 B2 | 8/2012 | Logan |
| 8,261,005 B2 | 9/2012 | Flynn et al. |
| 8,261,267 B2 | 9/2012 | Iwamatsu et al. |
| 8,332,370 B2 | 12/2012 | Gattegno et al. |
| 2002/0019788 A1 | 2/2002 | Stehle et al. |
| 2002/0038296 A1 | 3/2002 | Margolus et al. |
| 2002/0178335 A1 | 11/2002 | Selkirk et al. |
| 2002/0198788 A1 | 12/2002 | Moskowitz et al. |
| 2003/0058238 A1 | 3/2003 | Doak et al. |
| 2004/0049603 A1 | 3/2004 | Boyd et al. |
| 2004/0153451 A1 | 8/2004 | Phillips et al. |
| 2004/0205202 A1 | 10/2004 | Nakamura et al. |
| 2004/0267672 A1 | 12/2004 | Gray et al. |
| 2005/0131875 A1 | 6/2005 | Riccardi et al. |
| 2006/0218544 A1 | 9/2006 | Chakraborty et al. |
| 2006/0230222 A1 | 10/2006 | Yamagami |
| 2006/0294234 A1 | 12/2006 | Bakke et al. |
| 2007/0055702 A1 | 3/2007 | Fridella et al. |
| 2007/0260831 A1 | 11/2007 | Michael et al. |
| 2008/0065835 A1 | 3/2008 | Iacobovici et al. |
| 2008/0104039 A1 | 5/2008 | Lowson |
| 2008/0120470 A1 | 5/2008 | Dhamankar et al. |
| 2008/0128484 A1 | 6/2008 | Spaeth et al. |
| 2008/0140910 A1 | 6/2008 | Flynn et al. |
| 2008/0147755 A1 | 6/2008 | Chapman |
| 2008/0155051 A1 | 6/2008 | Moshayedi |
| 2008/0155223 A1 | 6/2008 | Hiltgen et al. |
| 2008/0184273 A1 | 7/2008 | Sekar |
| 2008/0235479 A1 | 9/2008 | Scales et al. |
| 2008/0282337 A1 | 11/2008 | Crawford |
| 2009/0172665 A1 | 7/2009 | Tene et al. |
| 2009/0198731 A1 | 8/2009 | Noonan, III |
| 2009/0248835 A1 | 10/2009 | Panda et al. |
| 2009/0249001 A1 | 10/2009 | Narayanan et al. |
| 2009/0282101 A1 | 11/2009 | Lim et al. |
| 2009/0300301 A1 | 12/2009 | Vaghani |
| 2009/0327621 A1 | 12/2009 | Kliot et al. |
| 2010/0042796 A1 | 2/2010 | Vasilevsky et al. |
| 2010/0070725 A1 | 3/2010 | Prahlad et al. |
| 2010/0083276 A1 | 4/2010 | Green et al. |
| 2010/0094806 A1 | 4/2010 | Apostolides et al. |
| 2010/0115184 A1 | 5/2010 | Chang |
| 2010/0115208 A1 | 5/2010 | Logan |
| 2010/0122248 A1 | 5/2010 | Robinson et al. |
| 2010/0146190 A1 | 6/2010 | Chang |
| 2010/0228913 A1 | 9/2010 | Czezatke et al. |
| 2010/0235831 A1 | 9/2010 | Dittmer |
| 2010/0241785 A1 | 9/2010 | Chen et al. |
| 2010/0250630 A1 | 9/2010 | Kudo |
| 2010/0306467 A1 | 12/2010 | Pruthi et al. |
| 2010/0325441 A1 | 12/2010 | Laurie et al. |
| 2011/0055406 A1 | 3/2011 | Piper et al. |
| 2011/0072059 A1 | 3/2011 | Guarraci |
| 2011/0075557 A1 | 3/2011 | Chowdhury et al. |
| 2011/0197022 A1 | 8/2011 | Green et al. |
| 2011/0214172 A1 | 9/2011 | Hermann et al. |
| 2012/0079229 A1 | 3/2012 | Jensen et al. |
| 2012/0079583 A1 | 3/2012 | Christiansen et al. |
| 2012/0110281 A1 | 5/2012 | Green et al. |
| 2012/0144501 A1 | 6/2012 | Vangpat et al. |
| 2012/0233682 A1 | 9/2012 | Finogenov |
| 2012/0324560 A1 | 12/2012 | Matthew et al. |
| 2013/0041985 A1 | 2/2013 | Christiansen et al. |
| 2013/0179649 A1 | 7/2013 | Green et al. |
| 2013/0179959 A1 | 7/2013 | Green et al. |
| 2014/0164571 A1 | 6/2014 | Green |
| 2014/0172811 A1 | 6/2014 | Green |

FOREIGN PATENT DOCUMENTS

| | | |
|---|---|---|
| CN | 101554011 A | 10/2009 |
| CN | 101572660 A | 11/2009 |
| CN | 101622596 A | 1/2010 |
| EP | 2262164 A1 | 12/2010 |
| JP | 2010-033206 | 2/2010 |
| WO | WO 2009/146001 | 12/2009 |
| WO | WO 2012/039939 | 3/2012 |

OTHER PUBLICATIONS

"Virtual Hard Disk Image Format Specification", Microsoft Corporation, Oct. 11, 2006, 1-8.

"VMWare Recovering Vmware Snapshot after Parent Changed", http:--it.it-larsen.dk-index.php?option=com_content&view=article&id=6:vmware-recovering-vmware-snapshot-after-parent-changed&catid=1:vmware-35&Itemid=4, accessed Feb. 23, 2011, 1-3.

Kerr, "The Virtual Disk API in Windows 7", http:--msdn.microsoft.com-en-us-magazine-dd569754.aspx, accessed Feb. 23, 2011, 1-7.

Yang et al., "Windows Server 2008", Virtual Hard Disk Performance, A Microsoft White Paper, Mar. 2010, 1-35.

"How to Resize a Microsoft Virtual Hard Drive (VHD)", http:--sysadmingeek.com-articles-how-to-resize-a-microsoft-virtual-hard-drive-vhd-file-, accessed Jan. 24, 2011, 1-10.

Agarwal, "Distributed Checkpointing of Virtual Machines in Xen Framework", Thesis Submitted in Partial Fulfillment of the Requirements for the Degree of Master of Technology in Computer Science and Engineering, Department of Computer Science and Engineering, Indian Institute of Technology, Kharagpur, May 2008, 1-44.

Elnozahy et al., "The performance of Consistent Checkpointing", 11th Symposium on Reliable Distributed Systems, Houston, TX, USA, Oct. 5-7, 1992, 39-47.

International Patent Application No. PCT/US2011/055586, International Search Report dated May 31, 2012, 8 pages.

International Patent Application No. PCT/US2011/055591, International Search Report dated May 31, 2012, 8 pages.

"FSCTL_File_Level_Trim Control Code", Retrieved on: Jul. 11, 2012, Available at: http://msdn.microsoft.com/en-us/library/windows/hardware/hh451098(v=vs.85).aspx.

"TRIM/UNMAP Support in Windows Server 2012 & Hyper-V/VHDX", Published on: May 23, 2012, Available at: http://workinghardinit.wordpress.com/2012/05/23/trimunmap-support-in-windows-server-2012-hyper-vvhdx/.

Campbell, Lisa, "Hyper-V Scalability Evident in Its New Virtual Disk Format", Published on: Jul. 9, 2012, Available at: http://www.unitrends.com/hyper-v-backup/hyper-v-scalability-evident-virtual-disk-format/.

(56) References Cited

OTHER PUBLICATIONS

"Deploying Virtual Hard Disk Images", www.technet.microsoft.com-en-us-library-dd363560(WS.10,printer).aspx, accessed Dec. 8, 2010, 1-8.

"Using Differencing Disks", www.technet.microsoft.com-en-us-library-cc720381(WS.10,printer).aspx, accessed Dec. 8, 2010, 1-3.

International Patent Application No. PCT/US2012/027645: International Search Report and Written Opinion dated Sep. 25, 2012, 9 pages.

U.S. Appl. No. 13/711,637, Office Action mailed Sep. 23, 2014, 6 pgs.

U.S. Appl. No. 13/714,413, Amendment and Response filed Oct. 9, 2014, 11 pgs.

Australian Office Action in Application 2011305839, mailed Apr. 4, 2014, 3 pgs.

PCT International Search Report in International Application PCT/US2013/074509, mailed Mar. 28, 2014, 12 pgs.

PCT International Search Report in International Application PCT/US2013/075212, mailed Apr. 25, 2014, 10 pgs.

U.S. Appl. No. 12/938,383, Office Action mailed Aug. 14, 2014, 31 pgs.

U.S. Appl. No. 13/345,753, Amendment and Response filed Jul. 25, 2014, 14 pgs.

U.S. Appl. No. 13/714,413. Office Action mailed Aug. 13, 2014, 12 pgs.

European Communication and EESR in Application 12756990.3, mailed Jul. 18, 2014, 8 pgs.

European Communication in Application 12756990.3, mailed Aug. 5, 2014, 1 page.

Chinese 2nd Office Action in Application 201110343154.7, mailed Sep. 23, 2014, 18 pgs.

Chinese 2nd Office Action in Application 201110285468.6, mailed Sep. 30, 2014, 22 pgs.

Chinese 1st Office Action in Application 201110343154.7, mailed Jan. 22, 2014, 10 pgs.

Chinese 1st Office Action in Application 201110285468.6, mailed Jan. 30, 2014, 16 pgs.

Australian Office Action in Application 2011305839, mailed Jul. 2, 2014, 4 pgs.

U.S. Appl. No. 13/162,592, Office Action mailed May 28, 2014, 15 pgs.

Walla, "Kerberos Explained", Windows 2000 Advantage magazine, Microsoft Technet, May 2000, 6 pgs.

U.S. Appl. No. 12/938,383, Amendment and Response filed Jul. 14, 2014, 15 pgs.

U.S. Appl. No. 13/162,592, Amendment and response filed Apr. 4, 2014, 12 pgs.

U.S. Appl. No. 12/938,383, Office Action mailed Mar. 14, 2014, 31 pgs.

U.S. Appl. No. 12/888,433, Office Action mailed Mar. 28, 2014, 15 pgs.

U.S. Appl. No. 13/343,718, Amendment and Response filed Feb. 25, 2014, 12 pgs.

U.S. Appl. No. 13/345,753, Amendment and Response filed Feb. 7, 2014, 14 pgs.

U.S. Appl. No. 13/343,718, Office Action mailed Mar. 20, 2014, 20 pgs.

U.S. Appl. No. 13/207,014, Amendment and Response filed Apr. 16, 2014, 14 pgs.

U.S. Appl. No. 13/345,753, Office Action mailed Apr. 25, 2014, 24 pgs.

U.S. Appl. No. 13/162,592, Amendment and response filed Oct. 28, 2014, 12 pgs.

U.S. Appl. No. 13/345,753, Office Action mailed Oct. 31, 2014, 26 pgs.

U.S. Appl. No. 13/711,637, Amendment and Response filed Oct. 14, 2014, 8 pgs.

U.S. Appl. No. 13/711,637, Notice of Allowance mailed Nov. 3, 2014, 8 pgs.

PCT Written Opinion in International Application PCT/US2013/075212, mailed Oct. 22, 2014, 6 pgs.

U.S. Appl. No. 12/938,383, Amendment and Response filed Nov. 14, 2014, 15 pgs.

U.S. Appl. No. 13/714,413, Office Action mailed Dec. 15, 2014, 9 pgs.

U.S. Appl. No. 13/162,592, Office Action mailed Jan. 27, 2015, 13 pgs.

U.S. Appl. No. 13/345,753, Amendment and Response filed Jan. 29, 2015, 14 pgs.

U.S. Appl. No. 12/938,383, Notice of Allowance mailed Mar. 11, 2015, 10 pgs.

U.S. Appl. No. 13/207,014, Office Action mailed Mar. 5, 2015, 19 pgs.

European Supplementary Search Report in Application 12821531.6, mailed Feb. 13, 2015, 7 pgs.

European Communication in Application 12821531.6, mailed Mar. 3, 2015, 1 page.

U.S. Appl. No. 13/711,637, Notice of Allowance mailed Mar. 3, 2015, 8 pgs.

U.S. Appl. No. 13/714,413, Amendment and Response filed Feb. 20, 2015, 14 pgs.

Chinese 3rd Office Action in Application 201110343154.7, mailed Mar. 24, 2015, 7 pgs.

U.S. Appl. No. 13/162,592, Amendment and response filed Apr. 27, 2015, 12 pgs.

U.S. Appl. No. 13/345,753, Office Action mailed Apr. 30, 2015, 28 pgs.

"Disk cache infrastructure enhancements", Retrieved at <<http://publib.boulder.ibm.com/infocenter/wasinfo/v6r1/index.jsp?topic=/com.ibm.websphere.express.doc/info/exp/ae/cdyn_diskcacheenhance.html>>, Jun. 15, 2010, 2 pgs.

"Saving and Restoring ZFS Data", Retrieved at <<http://docs.huihoo.com/opensolaris/solaris-zfs-administration-guide/html/ch06s03.html>>, Jun. 13, 2008, 3 pgs.

Bandulet, Christian, "Object-Based Storage Devices", Retrieved at <<http://developers.sun.com/solaris/articles/ osd.html>>, Jul. 2007, 7 pgs.

ControlSphere Token data structure, Retrieved at <<http://www.securesystems.lv/HelpSystemITokenDataManager.htm>>, Retrieved Date: Nov. 18, 2011, pp. 10.

Dean, Randall W. et al., "Data Movement in Kernelized Systems", Retrieved at <<http://citeseerx.ist.psu.edu/viewdoc/download?3doi=10.1.1.56.4419&rep=rep1 &type=pdf >>, Proceedings of the Workshop on Micro-kernels and Other Kernel Architectures, 1992, 22 pgs.

Dell, "Automated, Integrated, and Scalable Protection of Virtual Machines", Retrieved at <<http://www.dell.com/downloads/global/products/pvaul/en/equallogicys_vmware_asmve_specsheet.pdf>> Retrieved Date: Jul. 26, 2010, 2 pgs.

Devulapalli, et al., "Design of an Intelligent Object-based Storage device", Retrieved at <<http://www.osc.edu/ research/network_file/projects/object/papers/istor-tr.pdf>>, retrieved date: Jul. 5, 2010, 12 pgs.

Eshel et al. "Panache: A Parallel File System Cache for Global File Access", Feb. 2010, 14 pages.

European Official Communication in Application 11827196.4, mailed May 2, 2013, 2 pgs.

International Search Report, Mailed Date: Apr. 9, 2012, Application No. PCT/US2011/050739, Filed Date: Sep. 7, 2011, 9 pages.

Jarvinen et al., "Embedded SFE: Offloading Server and Network Using Hardware Tokens", Jan. 2010, 21 pgs.

Lachaize, Renaud et al., "A Distributed Shared Buffer Space for Data-intensive Applications", Retrieved at<< http://1 ieeexplore.ieee.org/stamp/stamp.jsp?tp=&arnumber=1558659 >>, Proceedings of the Fifth IEEE International Symposium on Cluster Computing and the Grid, vol. 2, 2005, pp. 913-920.

Leser, Towards a Worldwide Distributed File System, Sep. 27, 1990, 13 pages.

Narayanan, D. et al., "Write Off-Loading: Practical Power Management for Enterprise Storage", Retrieved at <<http:// research.microsoft.com/en-us/um/people/antr/MS/fast08.pdf>> Feb. 2008, ACM Transactions on Storage (TOS), vol. 04, No. 3, 15 pages.

(56) References Cited

OTHER PUBLICATIONS

PCT International Search Report and Written Opinion in Application PCT/US2012/047261, mailed Jan. 31, 2013, 8 pgs.
PCT Preliminary Report on Patentability, mailed Mar. 26, 2013, in Application PCT/US2011/050739, 6 pgs.
Storage_Offload_Token structure, Retrieved at <<http://msdn.microsofl.com/en-us/library/windows/hardware/hh451469%28v=vs.85%29.aspx>>, Retrieved Date: Sep. 7, 2011, 2 Pages.
U.S. Appl. No. 12/888,433, Amendment and Response filed Feb. 27, 2013, 12 pgs.
U.S. Appl. No. 12/888,433, Amendment and Response filed Aug. 8, 2013, 12 pgs.
U.S. Appl. No. 12/888,433, Office Action mailed Nov. 27, 2012, 13 pgs.
U.S. Appl. No. 12/888,433, Office Action mailed May 8, 2013, 14 pgs.
U.S. Appl. No. 12/938,383, Office Action mailed Aug. 19, 2013, 26 pgs.
U.S. Appl. No. 13/207,014, Amendment and Response filed Sep. 24, 2013, 10 pgs.
U.S. Appl. No. 13/207,014, Office Action mailed Jun. 24, 2013, 15 pgs.
U.S. Appl. No. 13/343,718, Office Action mailed May 30, 2013, 16 pgs.
Wang, Cheng et al., "A Computation Offloading Scheme on Handheld Devices", Retrieved at << http://citeseerx.ist.psu.edu/2 viewdoc/download?doi=10.1.1.66.9721 &rep=rep1 &type=pdf >>, Journal of Parallel and Distributed Computing, vol. 64, No. 6, Jun. 2004, pp. 740-746.
Wang, et al., "Cooperative Cache Management in S2FS", Retrieved at <<http://citeseerx.isl.psu.edu/viewdoc/ download?doi=10.1.1.35.4829&rep=rep1&type=pdf>>, In Proceedings of PDPTA, May 10, 1999, pp. 7.
What pv technology means in vSphere, Retrieved at<< http://www.lusovirt.com/wordpress/?p=5 >>, Jan. 30, 2010, 7 pgs.
Microsoft, "Offloaded Data Transfer (ODX) with Intelligent Storage Arrays", Feb. 28, 2012, 14 pgs.
European Official Communication in Application 12756990.3, mailed Oct. 18, 2013, 2 pgs.
U.S. Appl. No. 12/938,383, Amendment and Response filed Nov. 19, 2013, 14 pgs.
U.S. Appl. No. 13/343,718, Amendment and Response filed Sep. 30, 2013, 12 pgs.
U.S. Appl. No. 13/343,718, Office Action mailed Nov. 25, 2013, 17 pgs.
U.S. Appl. No. 13/345,753, Office Action mailed Nov. 7, 2013, 24 pgs.
"Compatible Extending Offload Token Size", U.S. Appl. No. 13/714,413, filed Dec. 14, 2012, 69 pgs.
"Copy Offload for Disparate Offload Providers", U.S. Appl. No. 13/711,637, filed Dec. 12, 2012, 70 pgs.
U.S. Appl. No. 13/162,592, Office Action mailed Dec. 4, 2013, 15 pgs.
U.S. Appl. No. 13/207,014, Office Action mailed Jan. 16, 2014, 16 pgs.
Wikipedia, Universally Unique Identifier (UUID), located online at: http://en.wikipedia.org/wiki/Universally_unique_identifier, on Nov. 27, 2013, 2 pgs.
Wu et al., "Distributed Runtime Load-Balancing for Software Routers on Homogeneous Many-Core Processors", retrieved at: http://conferences.sigcomm.org/co-next/2010/Workshops/PRESTO_papers/01-Wu.pdf, Proc. of the ACM context workshop on programmable routers for extensible services of tomorrow (PRESTO), Nov. 30, 2011, 6 pgs.
U.S. Appl. No. 13/714,413, Notice of Allowance mailed Jun. 3, 2015, 13 pgs.
CZAP, Laszlo et al., Secure Key Exchange in Wireless Networks, 2011, IEEE, 6 pages.
U.S. Appl. No. 13/207,014, Amendment and Response filed Jun. 5, 2015, 14 pgs.
U.S. Appl. No. 13/162,592, Office Action mailed Jun. 18, 2015, 14 pgs.
Chinese 1st Office Action in Application 201280039140.9, mailed Aug. 5, 2015, 14 pgs.
European Communication in Application 13818561.6, mailed Jul. 21, 2015, 2 pgs.
Taiwanese Office Action and Search Report in Application 100128753, mailed Jul. 13, 2015, 8 pgs.
European Communication in Application 13821245.1, mailed Jul. 24, 2015, 2 pgs.

VIRTUAL DISK STORAGE TECHNIQUES

BACKGROUND

Storage virtualization technology allows for the separation of logical storage from physical storage. One exemplary use case for storage virtualization is within a virtual machine. A layer of virtualizing software (typically called a hypervisor or virtual machine monitor) is installed on a computer system and controls how virtual machines interact with the physical hardware. Since guest operating systems are typically coded to exercise exclusive control over the physical hardware, the virtualizing software can be configured to subdivide resources of the physical hardware and emulate the presence of physical hardware within the virtual machines. Another use case for storage virtualization is within a computer system configured to implement a storage array. In this case, physical computer systems or virtual machines can be connected to the storage array using the iSCSI protocol, or the like.

A storage handling module can be used to emulate storage for either a virtual or physical machine. For example, a storage handling module can handle storage IO jobs issued by a virtual or physical machine by reading and writing to one or more virtual disk files, which can be used to describe, i.e., store, the extents of the virtual disk, i.e., a contiguous area of storage such as a block. Likewise, the storage handling program can respond to write requests by writing bit patterns data for the virtual disk to one or more virtual disk files and respond to read requests by reading the bit patterns stored in the one or more virtual disk files.

SUMMARY

This document describes techniques for storing data for a virtual disk in one or more virtual disk files. In an exemplary configuration, a virtual disk extent can be associated with state information that indicates whether the virtual disk extent is described by a virtual disk file. Under certain conditions, the space used to describe the virtual disk extent can be reclaimed and state information can be used to determine how to handle subsequent read and/or write operations directed to the virtual disk extent. Reclaimed space, e.g., an extent built from one or more ranges, can be used to describe the same or another virtual disk extent. In addition to the foregoing, other techniques are described in the claims, the detailed description, and the figures.

It can be appreciated by one of skill in the art that one or more various aspects of the disclosure may include but are not limited to circuitry and/or programming for effecting the herein-referenced aspects; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
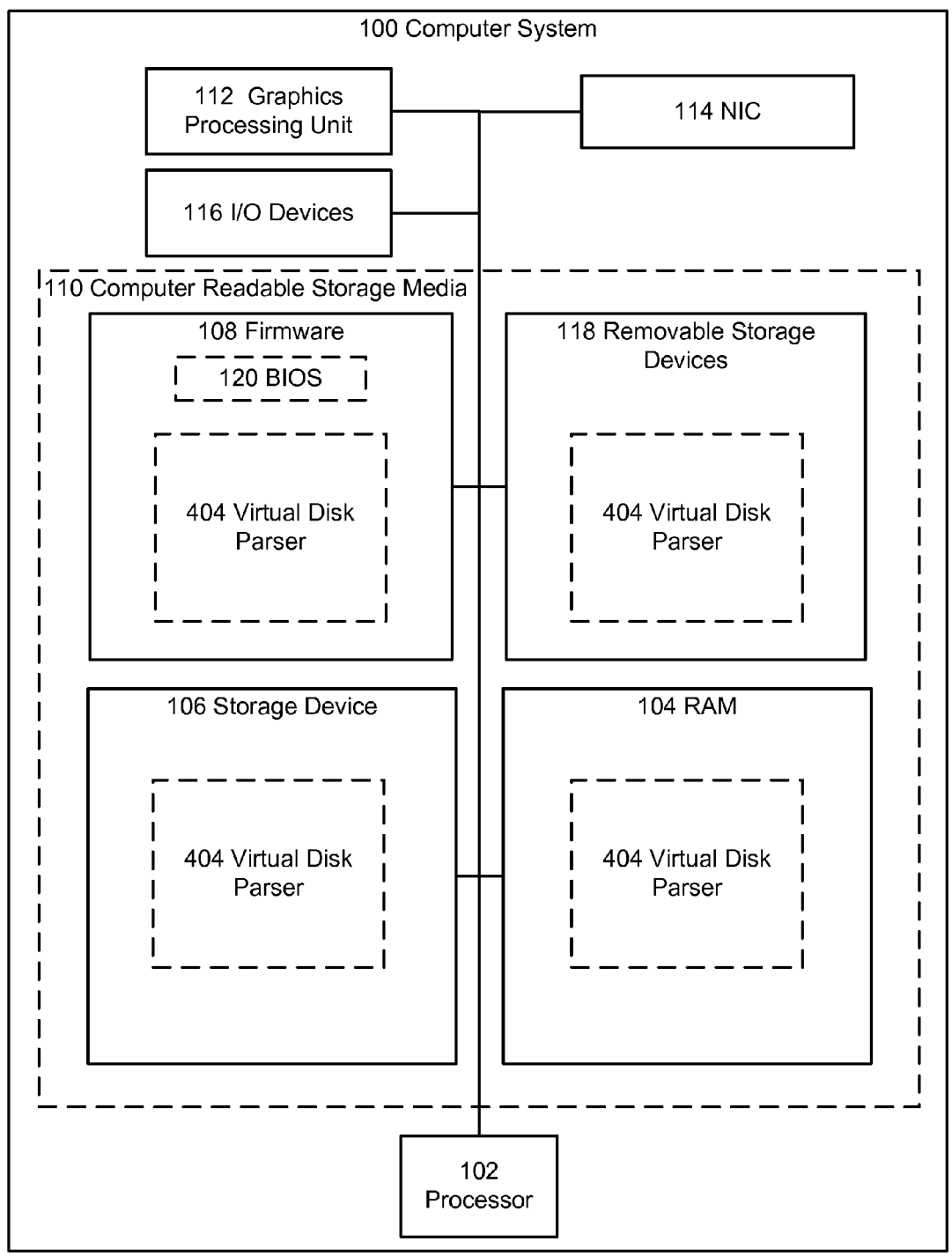
FIG. 1 depicts a high-level block diagram of a computer system.

The disclosed subject matter may use one or more computer systems. FIG. 1 and the following discussion are intended to provide a brief general description of a suitable computing environment in which the disclosed subject matter may be implemented.

The term circuitry used throughout can include hardware components such as hardware interrupt controllers, hard drives, network adaptors, graphics processors, hardware based video/audio codecs, and the firmware used to operate such hardware. The term circuitry can also include microprocessors, application specific integrated circuits, and processors, e.g., cores of a multi-core general processing unit that perform the reading and executing of instructions, configured by firmware and/or software. Processor(s) can be configured by instructions loaded from memory, e.g., RAM, ROM, firmware, and/or mass storage, embodying logic operable to configure the processor to perform a function(s). In an example embodiment, where circuitry includes a combination of hardware and software, an implementer may write source code embodying logic that is subsequently compiled into machine readable code that can be executed by hardware. Since one skilled in the art can appreciate that the state of the art has evolved to a point where there is little difference between hardware implemented functions or software implemented functions, the selection of hardware versus software to effectuate herein described functions is merely a design choice. Put another way, since one of skill in the art can appreciate that a software process can be transformed into an equivalent hardware structure, and a hardware structure can itself be transformed into an equivalent software process, the selection of a hardware implementation versus a software implementation is left to an implementer.

Referring now to FIG. 1, an exemplary computing system 100 is depicted. Computer system 100 can include processor 102, e.g., an execution core. While one processor 102 is illustrated, in other embodiments computer system 100 may have multiple processors, e.g., multiple execution cores per processor substrate and/or multiple processor substrates that could each have multiple execution cores. As shown by the figure, various computer-readable storage media 110 can be interconnected by one or more system busses which couples various system components to the processor 102. The system buses may be any of several types of bus structures including a memory bus or memory controller, a peripheral bus, and a local bus using any of a variety of bus architectures. In example embodiments the computer-readable storage media 110 can include for example, random access memory (RAM) 104, storage device 106, e.g., electromechanical hard drive, solid state hard drive, etc., firmware 108, e.g., FLASH RAM or ROM, and removable storage devices 118 such as, for example, CD-ROMs, floppy disks, DVDs, FLASH drives, external storage devices, etc. It should be appreciated by those skilled in the art that other types of computer readable storage media can be used such as magnetic cassettes, flash memory cards, and/or digital video disks.

The computer-readable storage media 110 can provide non volatile and volatile storage of processor executable instructions 122, data structures, program modules and other data for the computer system 100 such as executable instructions. A basic input/output system (BIOS) 120, containing the basic routines that help to transfer information between elements within the computer system 100, such as during start up, can be stored in firmware 108. A number of programs may be stored on firmware 108, storage device 106, RAM 104, and/or removable storage devices 118, and executed by processor 102 including an operating system and/or application programs. In exemplary embodiments, computer-readable storage media 110 can store virtual disk parser 404, which is described in more detail in the following paragraphs, can be executed by processor 102 thereby transforming computer system 100 into a computer system configured for a specific purpose, i.e., a computer system configured according to techniques described in this document.

Commands and information may be received by computer system 100 through input devices 116 which can include, but are not limited to, a keyboard and pointing device. Other input devices may include a microphone, joystick, game pad, scanner or the like. These and other input devices are often connected to processor 102 through a serial port interface that is coupled to the system bus, but may be connected by other interfaces, such as a parallel port, game port, or universal serial bus (USB). A display or other type of display device can also be connected to the system bus via an interface, such as a video adapter which can be part of, or connected to, a graphics processor unit 112. In addition to the display, computers typically include other peripheral output devices, such as speakers and printers (not shown). The exemplary system of FIG. 1 can also include a host adapter, Small Computer System Interface (SCSI) bus, and an external storage device connected to the SCSI bus.

Computer system 100 may operate in a networked environment using logical connections to one or more remote computers, such as a remote computer. The remote computer may be another computer, a server, a router, a network PC, a peer device or other common network node, and typically can include many or all of the elements described above relative to computer system 100.

When used in a LAN or WAN networking environment, computer system 100 can be connected to the LAN or WAN through network interface card 114. The NIC 114, which may be internal or external, can be connected to the system bus. In a networked environment, program modules depicted relative to the computer system 100, or portions thereof, may be stored in the remote memory storage device. It will be appreciated that the network connections described here are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
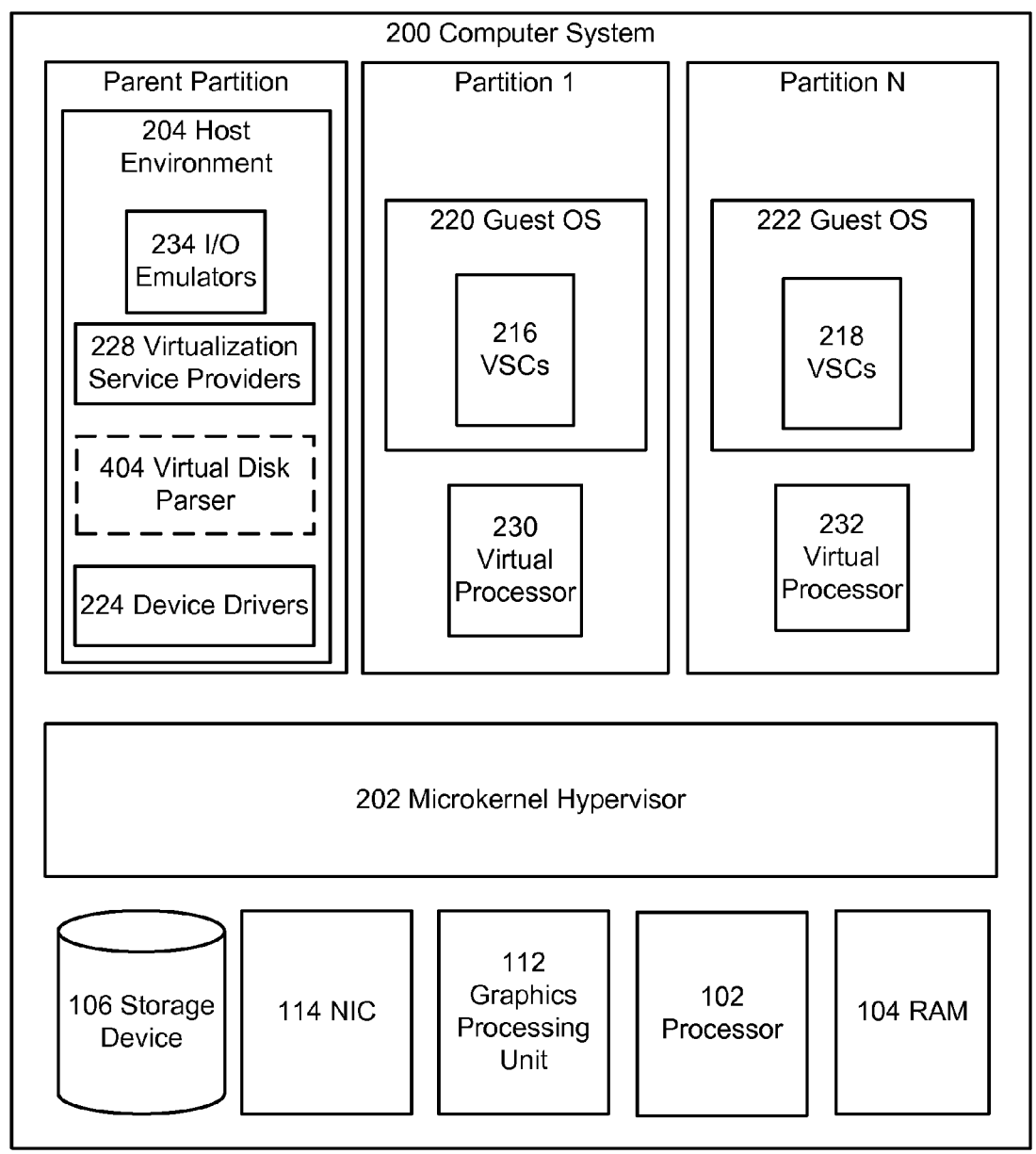
FIG. 2 depicts a high-level block diagram of an exemplary architecture for a virtualizing software program.

Turning to FIG. 2, illustrated is an exemplary virtualization platform that can be used to generate virtual machines. In this embodiment, microkernel hypervisor 202 can be configured to control and arbitrate access to the hardware of computer system 200. Microkernel hypervisor 202 can generate execution environments called partitions such as child partition 1 through child partition N (where N is an integer greater than 1). Here, a child partition is the basic unit of isolation supported by microkernel hypervisor 202. Microkernel hypervisor 202 can isolate processes in one partition from accessing another partition's resources. In particular, microkernel hypervisor 202 can isolate kernel mode code of a guest operating system from accessing another partition's resources as well as user mode processes. Each child partition can be mapped to a set of hardware resources, e.g., memory, devices, processor cycles, etc., that is under control of the microkernel hypervisor 202. In embodiments, microkernel hypervisor 202 can be a stand-alone software product, a part of an operating system, embedded within firmware of the motherboard, specialized integrated circuits, or a combination thereof.

Microkernel hypervisor 202 can enforce partitioning by restricting a guest operating system's view of the memory in a physical computer system. When microkernel hypervisor 202 instantiates a virtual machine, it can allocate pages, e.g., fixed length blocks of memory with starting and ending addresses, of system physical memory (SPM) to the virtual machine as guest physical memory (GPM). Here, the guest's restricted view of system memory is controlled by microkernel hypervisor 202. The term guest physical memory is a shorthand way of describing a page of memory from the viewpoint of a virtual machine and the term system physical memory is shorthand way of describing a page of memory from the viewpoint of the physical system. Thus, a page of memory allocated to a virtual machine will have a guest physical address (the address used by the virtual machine) and a system physical address (the actual address of the page).

A guest operating system may virtualize guest physical memory. Virtual memory is a management technique that allows an operating system to over commit memory and to give an application sole access to a logically contiguous working memory. In a virtualized environment, a guest operating system can use one or more page tables, called guest page tables in this context, to translate virtual addresses, known as virtual guest addresses into guest physical addresses. In this example, a memory address may have a guest virtual address, a guest physical address, and a system physical address.

In the depicted example, parent partition component, which can also be also thought of as similar to domain 0 of Xen's open source hypervisor can include a host environment 204. Host environment 204 can be an operating system (or a set of configuration utilities) and host environment 204 can be configured to provide resources to guest operating systems executing in the child partitions 1-N by using virtualization service providers 228 (VSPs). VSPs 228, which are typically referred to as back-end drivers in the open source community, can be used to multiplex the interfaces to the hardware resources by way of virtualization service clients (VSCs) (typically referred to as front-end drivers in the open source community or paravirtualized devices). As shown by the figures, virtualization service clients execute within the context of guest operating systems. However, these drivers are different than the rest of the drivers in the guest in they communicate with host environment 204 via VSPs instead of communicating with hardware or emulated hardware. In an exemplary embodiment the path used by virtualization service providers 228 to communicate with virtualization service clients 216 and 218 can be thought of as the enlightened IO path.

As shown by the figure, emulators 234, e.g., virtualized IDE devices, virtualized video adaptors, virtualized NICs, etc., can be configured to run within host environment 204 and are attached to emulated hardware resources, e.g., IO ports, guest physical address ranges, virtual VRAM, emulated ROM ranges, etc. available to guest operating systems 220 and 222. For example, when a guest OS touches a guest virtual address mapped to a guest physical address where a register of a device would be for a memory mapped device, microkernel hypervisor 202 can intercept the request and pass the values the guest attempted to write to an associated emulator. Here, the emulated hardware resources in this example can be thought of as where a virtual device is located in guest physical address space. The use of emulators in this way can be considered the emulation path. The emulation path is inefficient compared to the enlightened IO path because it requires more CPU time to emulate devices than it does to pass messages between VSPs and VSCs. For example, several actions on memory mapped to registers are required in order to write a buffer to disk via the emulation path, while this may be reduced to a single message passed from a VSC to a VSP in the enlightened IO path, in that the drivers in the VM are designed to access IO services provided by the virtualization system rather than designed to access hardware.

Each child partition can include one or more virtual processors (230 and 232) that guest operating systems (220 and 222) can manage and schedule threads to execute thereon. Generally, the virtual processors are executable instructions and associated state information that provide a representation of a physical processor with a specific architecture. For example, one virtual machine may have a virtual processor having characteristics of an Intel x86 processor, whereas another virtual processor may have the characteristics of a PowerPC processor. The virtual processors in this example can be mapped to processors of the computer system such that the instructions that effectuate the virtual processors will be directly executed by physical processors. Thus, in an embodiment including multiple processors, virtual processors can be simultaneously executed by processors while, for example, other processor execute hypervisor instructions. The combination of virtual processors and memory in a partition can be considered a virtual machine.

Guest operating systems (220 and 222) can be any operating system such as, for example, operating systems from Microsoft®, Apple®, the open source community, etc. The guest operating systems can include user/kernel modes of operation and can have kernels that can include schedulers, memory managers, etc. Generally speaking, kernel mode can include an execution mode in a processor that grants access to at least privileged processor instructions. Each guest operating system can have associated file systems that can have applications stored thereon such as terminal servers, e-commerce servers, email servers, etc., and the guest operating systems themselves. The guest operating systems can schedule threads to execute on the virtual processors and instances of such applications can be effectuated.

Figure 3:
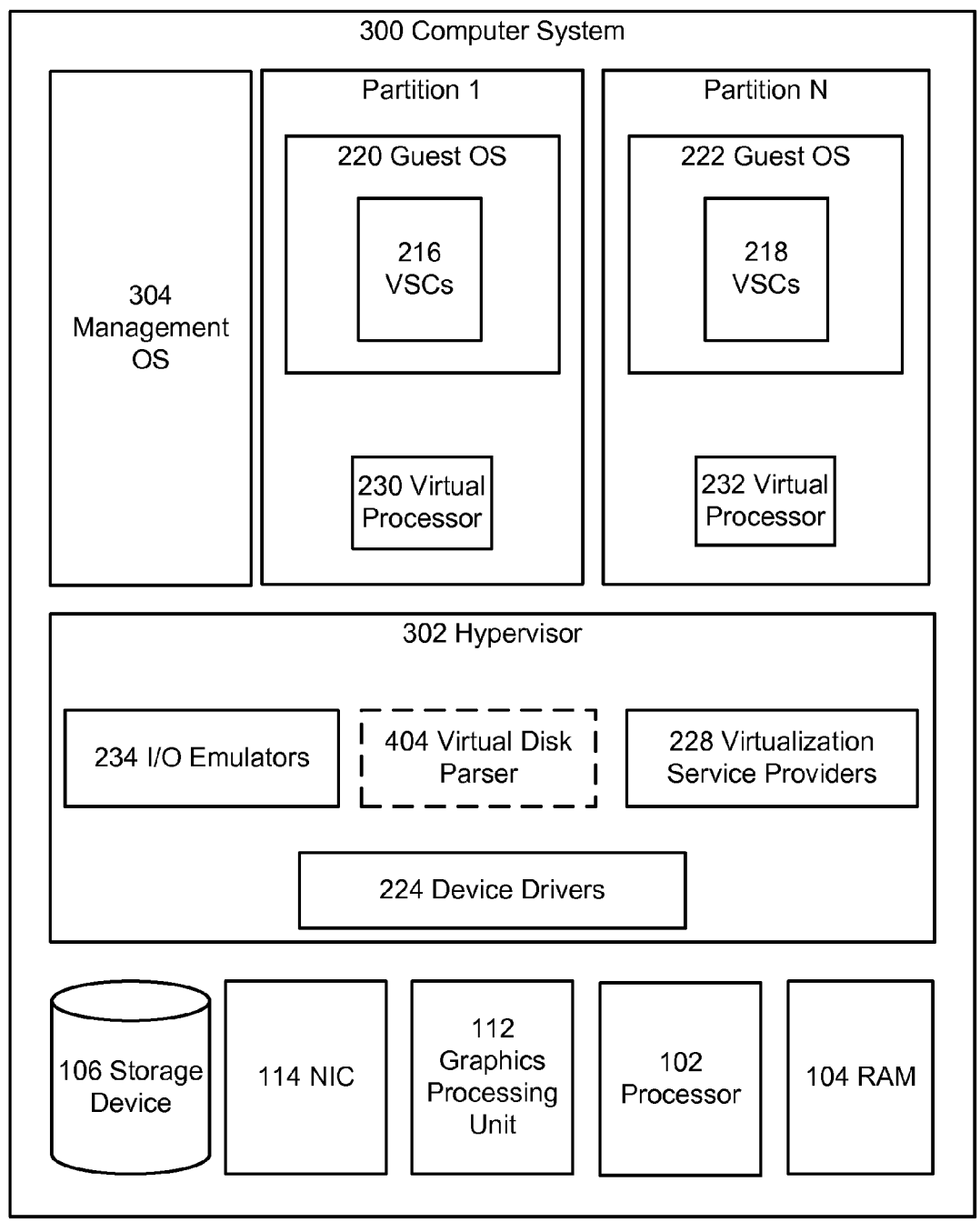
FIG. 3 depicts a high-level block diagram of an alternative architecture for a virtualizing software program.

Referring now to FIG. 3, it illustrates an alternative virtualization platform to that described above in FIG. 2. FIG. 3 depicts similar components to those of FIG. 2; however, in this example embodiment hypervisor 302 can include a microkernel component and components similar to those in host environment 204 of FIG. 2 such as the virtualization service providers 228 and device drivers 224, while management operating system 304 may contain, for example, configuration utilities used to configure hypervisor 302. In this architecture, hypervisor 302 can perform the same or similar functions as microkernel hypervisor 202 of FIG. 2; however, in this architecture hypervisor 304 effectuates the enlightened IO path and includes the drivers for the physical hardware of the computer system. Hypervisor 302 of FIG. 3 can be a stand alone software product, a part of an operating system, embedded within firmware of the motherboard or a portion of hypervisor 302 can be effectuated by specialized integrated circuits.

Figure 4:
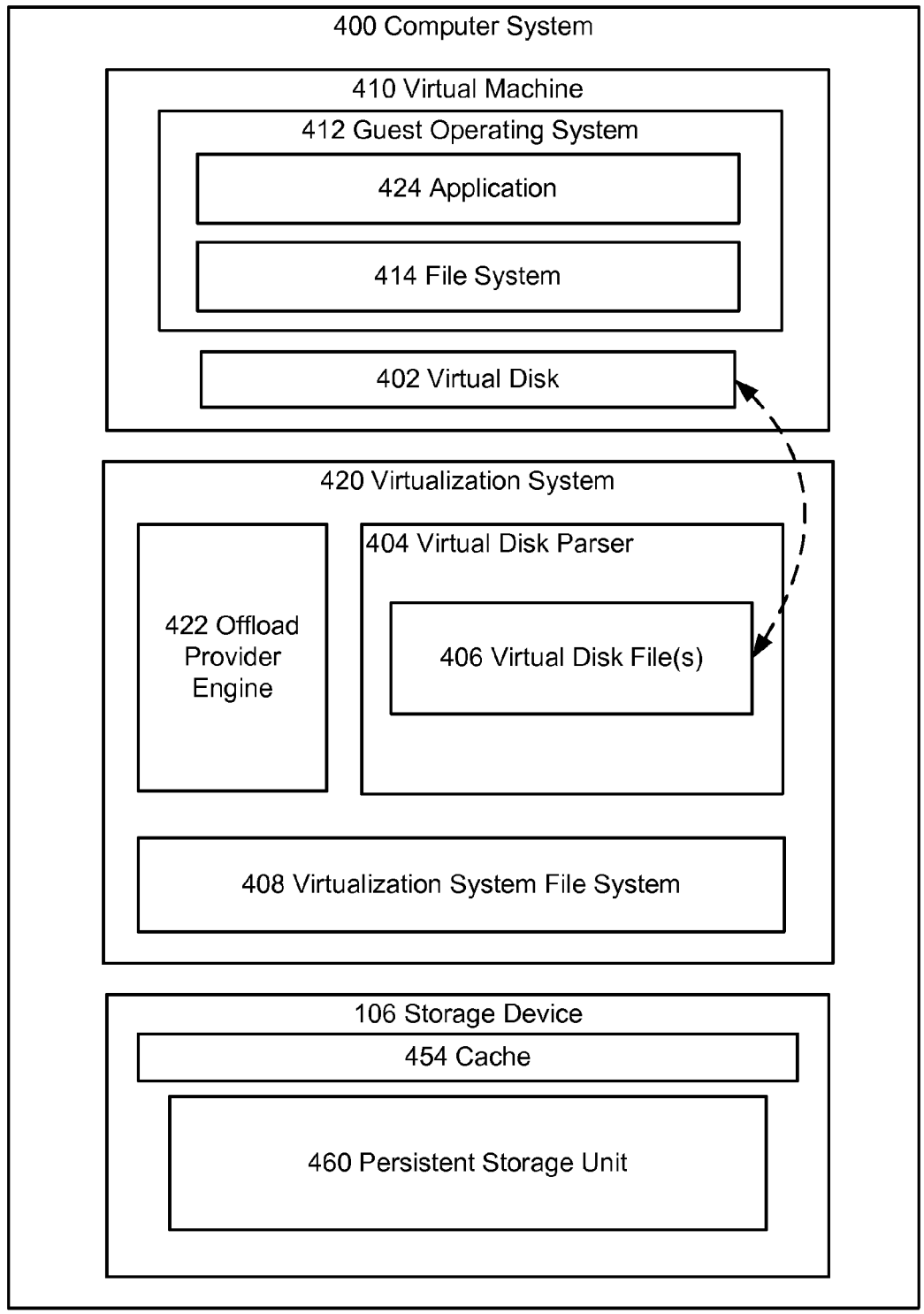
FIG. 4 depicts a lower-level block diagram of a computer system configured to effectuate a virtual disk.

Turning now to FIG. 4, it describes computer system 400, which illustrates a high-level block diagram of components that can be used to effect the techniques described in this document. Briefly, computer system 400 can include components similar to those described above with respect to FIG. 1 through 3. FIG. 4 shows virtualization system 420, which can be thought of as a high-level representation of the virtualization platform illustrated by FIG. 2 or FIG. 3. For example, virtualization system 420 can be though of as a high-level representation of the combination of features provided by microkernel hypervisor 202 and host environment 204. Alternatively, virtualization system 420 can be thought of as a high-level representation of hypervisor 302 and management OS 304. Thus, use of the term "virtualization system 420" throughout this document signals that the virtual disk techniques described in the following paragraphs can be implemented within any type of virtualization software layer or in any type of virtualization platform.

Virtualization system 420 can include offload provider engine 422. Briefly, offload provider engine 422 can be configured to service offload read and offload write requests (sometimes called PROXY READ and PROXY WRITE) issued by, for example, application 424. An offload read request is a request to create a token that represents data that would have been read if the offload read had been a normal read. An offload write is a request to write the data represented by a token to a destination location. In one usage example, an offload read followed by an offload write can be used to copy data from one location to another, e.g., from computer system 400 to a destination computer system within a domain by using tokens that represent the data to avoid moving the data through local RAM. For example, suppose that computer system 400 and a destination computer system (not shown) can access a common data repository and a request to copy data from computer system to the destination is received. Instead of copying the data to the destination, application 424 can issue a request to offload provider engine 422 to issue a token that represents the data as it exists at the time the token is associated with the data. The token can be sent to the destination and used by a program running on the destination to obtain the data from the common data storage repository and write the data to the destination. Copy-offload techniques are described in more detail in co-pending U.S. patent application Ser. No. 12/888,433, entitled "Offload Reads and Writes" and U.S. patent application Ser. No. 12/938,383, entitled "Virtualization and Offload Reads and Writes," the contents of which are herein incorporated by reference in their entirety to the extent they are consistent with techniques described in this document.

Virtual disk parser 404, which can be a module of executable instructions in a specific example embodiment, can be used to instantiate virtual disks from virtual disk files and handle storage IO on behalf of a virtual machine. As shown by the figure, virtual disk parser 404 can open one or more virtual disk files such as virtual disk file(s) 406 and generate virtual disk 402.

Virtual disk parser 404 can obtain virtual disk file(s) 406 from storage device 106 via virtualization system file system 408. Briefly, virtualization system file system 408 represents a software module that organizes computer files and data of virtualization system 420, such as virtual disk file(s) 406. Virtualization system file system 408 can store this data in an array of fixed-size physical extents, i.e., contiguous areas of storage on a physical storage device. In a specific example, an extent can be a cluster, which is a sequence of bytes of bits having a set length. Exemplary cluster sizes are typically a power of 2 between 512 bytes and 64 kilobytes. In a specific configuration, a cluster size can be 4 kilobytes.

When a request to open virtual disk file 406 is received, virtualization system file system 408 determines where the file is located on disk and issues an IO job to the disk device driver to read the data from one or more physical extents of the disk. The IO job issued by file system 408 determines a disk offset and length that describes the location of the persistent copy of virtual disk file 406 on storage device 106 and issues the IO job to storage device 106. Due to the semantics of how storage devices operate, a write IO job can be buffered in one or more levels of caches of volatile memory, represented by cache 454, until the circuitry of storage device 106 determines to access the location on the persistent storage unit 460, e.g., a platter, a flash memory cell, etc., and write the buffered bit pattern indicative of the new contents of the persistent copy of the virtual disk file(s) 406 to persistent storage unit 460.

Virtual disk parser 404 can obtain the bit pattern indicative of virtual disk file(s) 406 and expose the payload, e.g., user data, in the virtual disk file(s) 406 as a disk including a plurality of virtual disk extents. In an embodiment, these virtual disk extents can be a fixed-size block 512 kilobytes up to 64 megabytes in size and partitioned into a plurality of sectors; however, in another embodiment the virtual disk extents could be variable-sized extents. In an exemplary configuration, prior to booting guest operating system 412, resources related to an emulated or enlightened storage controller and emulated or enlightened aspects of a virtual disk are setup such that an emulated storage controller with memory mapped registers is effected within guest physical address space of the virtual machine 410. Boot code can run and boot guest operating system 412. Virtualization system 420 can detect an attempt to access this region of guest physical address space and return a result that causes guest operating system 412 to determine that a storage device is attached to the emulated storage controller. In response, guest operating system 412 can load a driver (either a paravirtualization driver or a regular driver) and use the driver to issue storage IO requests to the detected storage device. Virtualization system 420 can route the storage IO requests to virtual disk parser 404.

After guest operating system 412 is running it can issue IO jobs to virtual disk 402 via file system 414, which is similar to virtualization system file system 414 in that it organizes computer files and data of guest operating system 412 and applications installed on guest operating system 412. Guest operating system 412 can interact with virtual disk 402 in a way that is similar to how an operating system interacts with a physical storage device and eventually the IO jobs are routed to virtual disk parser 404. Virtual disk parser 404 can include logic for determining how to respond to the IO jobs in a way that emulates a physical storage device. For example, virtual disk parser 404 can read data from virtual disk file(s) 406 and write data to virtual disk file(s) 406. The data written to virtual disk file(s) 406 in turn is routed through virtualization system file system 408 and committed to a persistent copy of virtual disk file(s) 406 stored on or in persistent storage unit 460.

Figure 5A:
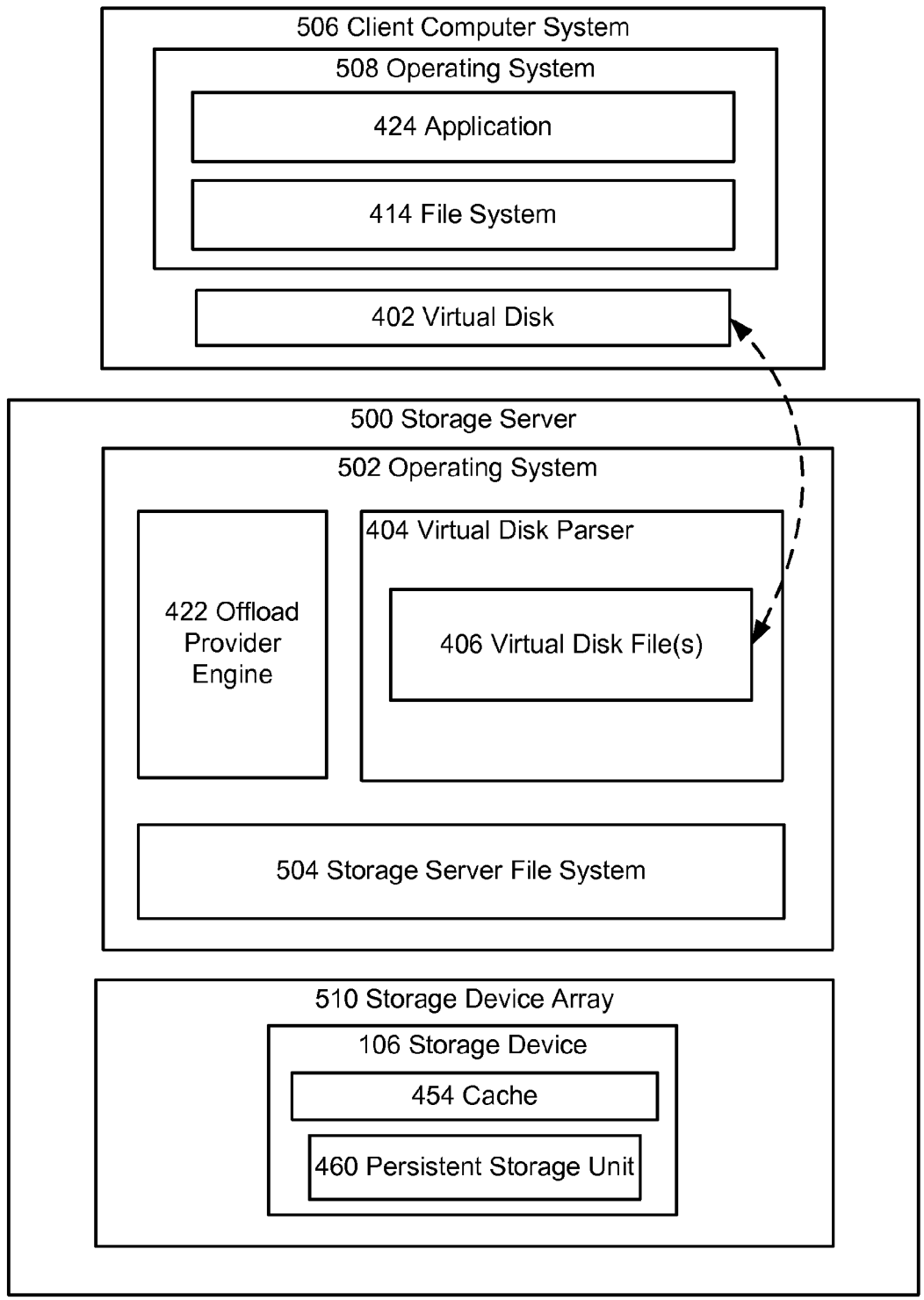
FIG. 5A depicts a lower-level block diagram of a computer system configured to effectuate a virtual disk.

Referring briefly to FIG. 5A, it illustrates an alternative architecture for implementing techniques described in this document. As shown by FIG. 5, virtual disk parser 404 can also be implemented in an operating system 502 such as an operating system offered by Microsoft®. In this example, virtual disk parser 404 can be configured to run on storage server 500, which could include components similar to computer system 100 of FIG. 1. In this example, storage server 500 could include an array of physical storage devices 510 and can be configured to make storage available to servers such that the storage appears as locally attached to operating system 508. Virtual disk parser 404 can operate the same as it was described with respect to FIG. 4; the difference being in this configuration read/write IO jobs issued by file system 414 can be routed over a network connection to virtual disk parser 404.

Figure 5B:
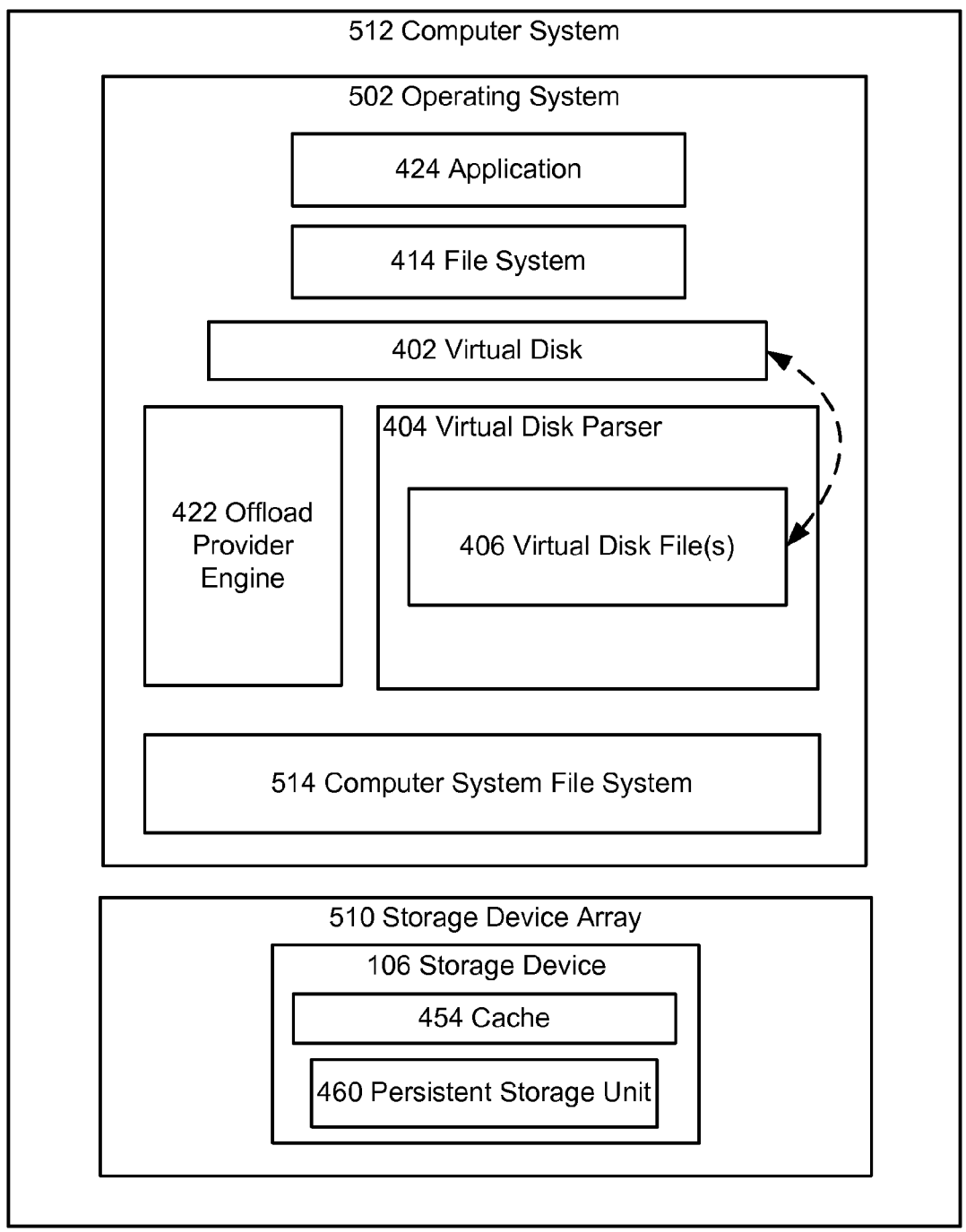
FIG. 5B illustrates a lower-level block diagram of a computer system configured to effectuate a virtual disk.

Referring briefly to FIG. 5B, it illustrates yet another architecture for implementing techniques described in this document. FIG. 5B is similar to FIG. 5A in that virtual disk parser 404 is implemented in operating system 502 and computer system 512 could include components similar to computer system 100 of FIG. 1. The difference in this example; however, is that the figure illustrates a loopback-attached virtual disk 402. File system 414, including applications such as application 424 can be stored in virtual disk 402 and virtual disk file(s) 406 can be stored in computer system file system 514.

Figure 6:
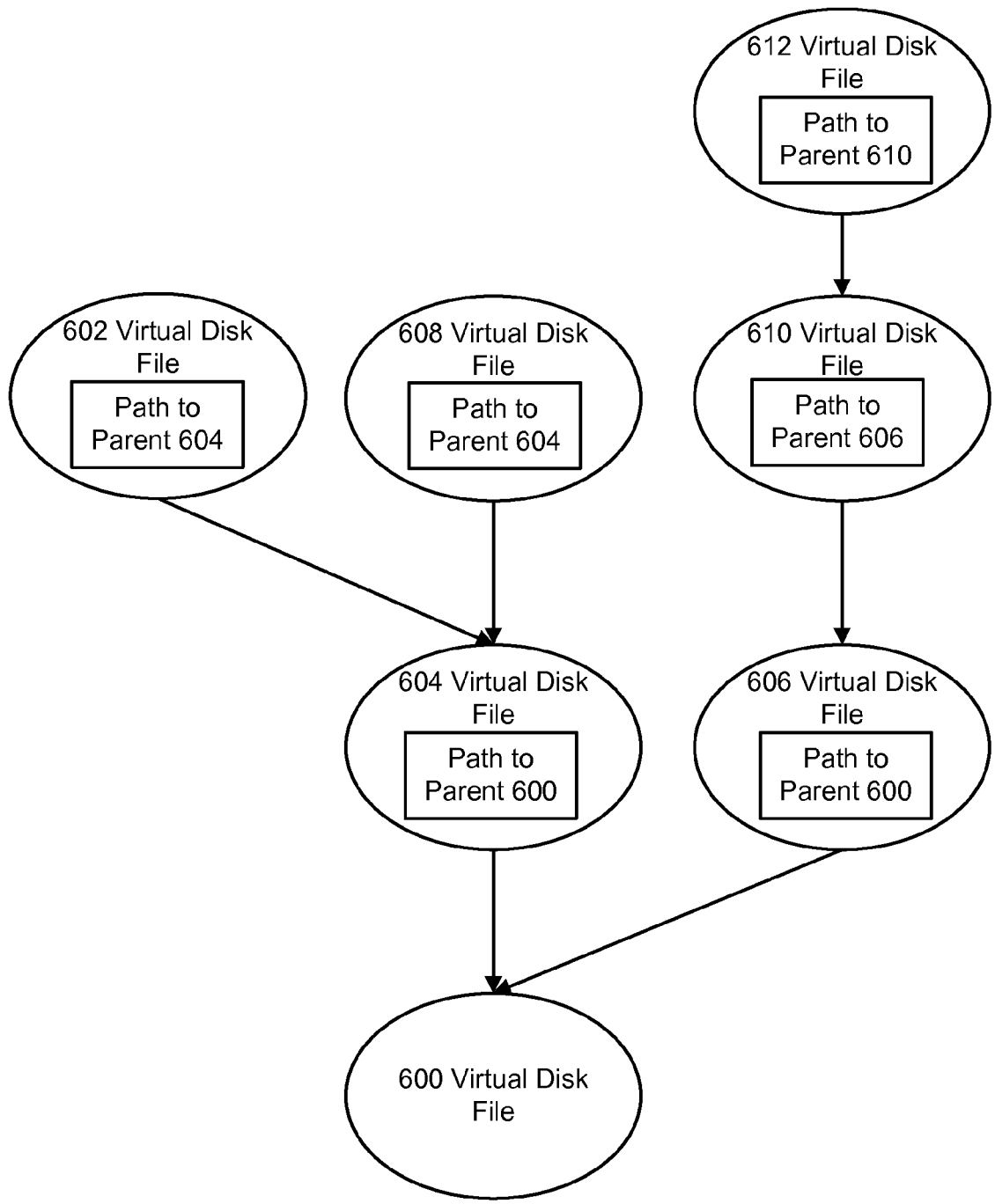
FIG. 6 depicts a high-level block diagram of a differencing disk.

Turning attention now to virtual disk 402, while it can be effected by a single virtual disk file, in other configurations a group of differencing virtual disk files can be used to bring about virtual disk 402. FIG. 6 illustrates exemplary chains of virtual disk files that can be used by virtual disk parser 404 to effect virtual disk 402 as a differencing disk. Generally, a differencing virtual disk file represents the current state of a virtual disk as a set of modified extents in comparison to a parent image. The parent image can be another differencing virtual disk file or a base virtual disk file.

In an exemplary configuration, the linking between a parent virtual disk file and a child virtual disk file can be stored within the child. In particular, the child can include an identifier of the parent and a value that describes the location of the parent. When starting a virtual machine, virtual disk parser 404 may receive information that describes the last virtual disk file in the chain, i.e., virtual disk file 612 is the last in a chain that includes virtual disk files 612, 610, 606, and 600, and open this file. This file can include an identifier of its parent, i.e., virtual disk file 610, and a path to it. Virtual disk parser 404 can locate and open the parent and so on and so forth until a base virtual disk file is located and opened.

Virtual disk parser 404 can use information that indicates whether data is present or stored in a parent virtual disk file. Typically, the last virtual disk file in the chain is opened as read/modify and other virtual disk files are opened as read only. Thus, writes are typically made to the last virtual disk file in the chain. Read operations are similarly directed first to the last virtual disk file in the chain and virtual disk parser 404 will logically search the virtual disk files in logical order from last to base until the data is found in the instance that information about where the data is located is not cached. In a specific example, a block allocation table (not shown) for a virtual disk file, e.g., virtual disk file 612, can include state information that indicates whether the virtual disk extent is defined by a section of the virtual disk file or if this virtual disk extent is transparent, e.g., defined by a different virtual disk file further along the chain. In one implementation, virtual disk parser 404 can determine whether this virtual disk extent is transparent and access the block allocation table for the next virtual disk file in the chain, e.g., virtual disk file 610, and so on and so forth until a virtual disk file in the chain is located that defines the data.

Figure 7:
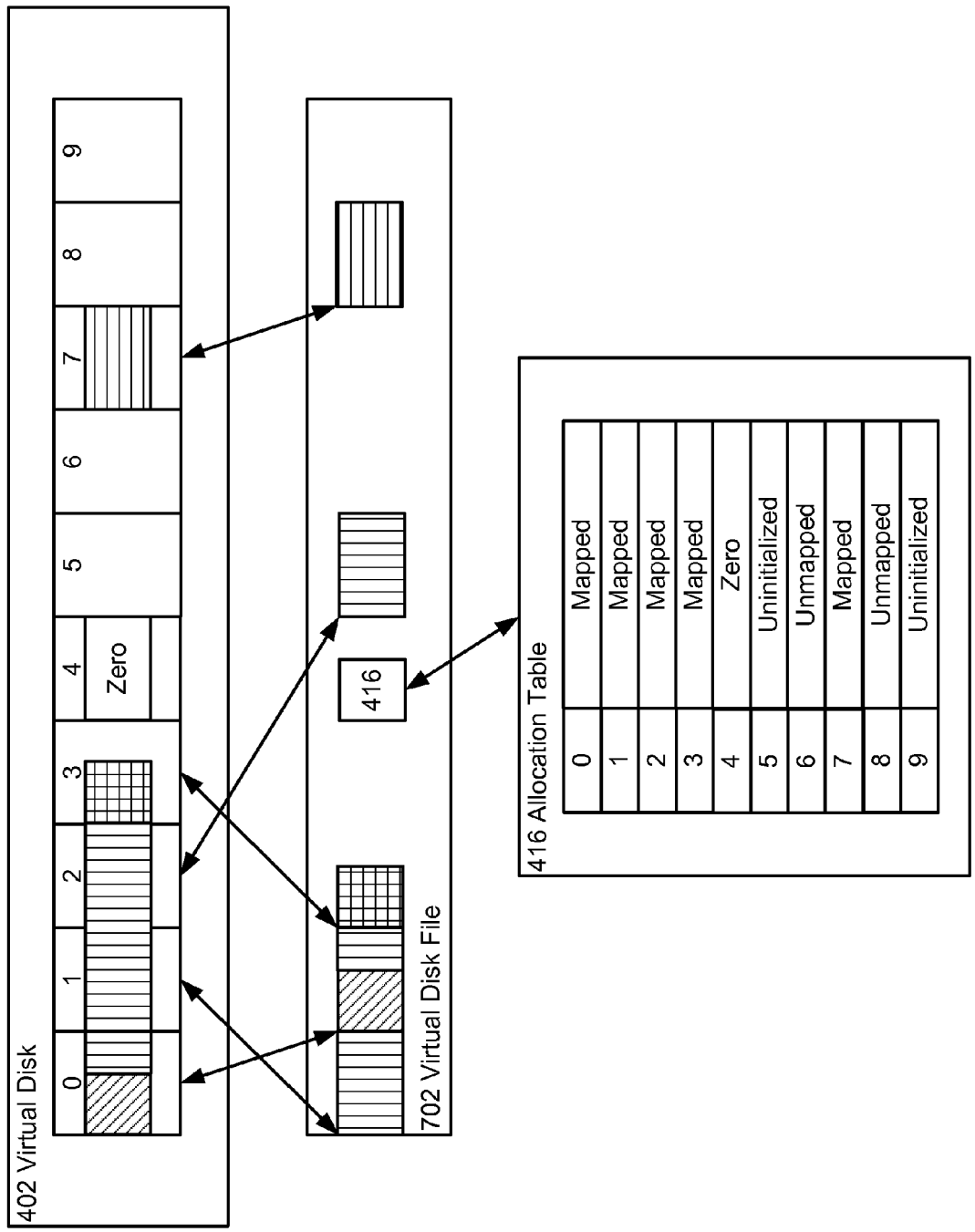
FIG. 7 depicts a high-level illustration of the relationship between a virtual disk and a virtual disk file.

Referring now to FIG. 7, it illustrates virtual disk 402 described at least in part by virtual disk file 702, which could be similar to any virtual disk file described in FIG. 6 that is write/modifiable, e.g., virtual disk file 602, 608, or 612, or a single virtual disk file. As shown by the figure, virtual disk 402 can include N extents of storage (where N is an integer greater than 0) and in this specific example virtual disk 402 includes 10 extents. Virtual disk 402 is illustrated as including the bit patterns for different files and data for guest operating system 412, which are differentiated by the different patterns within the virtual disk extents.

Since virtual disk 402 is not a physical storage device, the underlying payload data for the virtual disk extents can be "described by," i.e., stored in, different sections within virtual disk file 702. For example, virtual disk extent 1 is described by a section that is defined by a virtual disk file offset value 0 or the first offset that can be used to store payload data. Allocation table 416, which can be stored in random access memory while computer system 400 is in operation, can be persisted in virtual disk file 702 in any section and can span multiple sections. Briefly, allocation table 416 can include information that links virtual disk extents to sections of virtual disk file 702. For example, allocation table 416 can store information that defines the virtual disk file byte offsets that define the section of virtual disk file 702 that stores the data. The arrows signify the relationships stored in allocation table 416.

Described in more detail in the following paragraphs, allocation table 416 can also include state information; however, this configuration is exemplary. In alternate configurations this information can be stored in a different section of virtual disk file 702 and loaded into RAM 104. Allocation table 416 can include an entry for each virtual disk extent; state information indicating what state each extent is in; and a file offset indicating where in virtual disk file 702 each virtual disk extent is described (not illustrated). In an alternative embodiment an extent could also be defined by multiple already-mapped and contiguous (in file offset) table entries. In this configuration, reads and writes that cross block boundaries can be serviced as a single read/write to virtual disk file 702 if the block payloads are contiguous in the file. In a specific example, virtual disk parser 404 can also store information that indicates what type of bit pattern is stored in each unused section of the virtual disk file, i.e., a free space map. In addition to the foregoing, the free-space map can allow be used by virtual disk parser 404 to determine which sectors of virtual disk file 406 are used and which are free. The free space map in this example can be configured to track free space in the file that is non-zero. In an exemplary embodiment, because using a non-zero portion of free space to describe a portion of virtual disk 402, which must be zero or must not disclose information from other virtual disk offsets, the free space is overwritten with zeros or a non-information disclosing pattern (typically zeros), respectively. Virtual disk parser 404 can use this information in order to determine what section of virtual disk file to allocate to a virtual disk extent. For example, if a virtual disk extent in the zero state is written to, virtual disk parser 404 can allocate a section that already has zeros in it to back the virtual disk extent.

As guest operating system 412 or operating system 508 runs it will generate data and files and issue disk writes to virtual disk 402 to store data. When virtual disk file 702 does not have any additional non-used space, virtual disk parser 404 can extend the end of file and use the new space to describe the virtual disk extents. Guest operating system 412 or operating system 508 may use, delete, and reuse sections of virtual disk 402; however, since virtual disk parser 404 is merely storing data on behalf of file system 414, virtual disk parser 404 may be unable to determine whether a section of virtual disk file is still being used by guest operating system 412. Consequently, virtual disk parser 404 may hold allocated space in virtual disk file 702 to describe virtual disk extents that are no longer in use by file system 414. The result of this is that the size of virtual disk file 702 may grow until it reaches the size of virtual disk 402.

In exemplary embodiments, virtual disk parser 404 can be configured to reclaim unused sections of a virtual disk file and optionally reuse them. As such, the frequency at which the virtual disk file needs to be extended is reduced, and the overall size of the virtual disk file is reduced. In an example embodiment, when a file system signals that it is no longer using a virtual disk extent, virtual disk parser 404 can de-allocate, i.e., unlink, the virtual disk extent from the virtual disk file and associate the virtual disk extent with information that describes how read operations to the virtual disk extent should be treated. The section of the virtual disk file can then be reused to describe the same or another virtual disk extent.

In an exemplary configuration, virtual disk parser 404 can use TRIM, UNMAP, and/or WRITE SAME of zero commands issued by a file system to determine when a virtual disk extent can be de-allocated from virtual disk file(s) 406. TRIM commands can be issued by guest operating system 412 or operating system 508. For example, as guest operating system 412 or operating system 508 runs, file system 414 may determine that some sectors are no longer needed and issue a TRIM command. Alternatively or additionally, virtual disk parser 404 can be configured to request that file system 414 issue TRIM commands at predetermined intervals, or when predetermined criteria are satisfied, e.g., when virtual machine 410 is instantiated, when virtual machine 410 is shut down, under light use, etc.

Briefly, a TRIM command is used to inform the data storage device as to which sectors are no longer considered in use so that the data stored therein can be optionally discarded by the data storage device. One type of TRIM command, called a free space TRIM command, can be used by file system 414 to signal that sectors are no longer in use by file system 414 and the other, called a standard TRIM command, does not. The difference between the two types of TRIM commands is that when a sector is the subject of a free space TRIM, file system 414 provides security for the sector by preventing user space applications and the like from reading from the sector. The fact that file system 414 secures access to sectors that have been trimmed in this way can be used to increase the ability to efficiency allocate virtual disk file space. This particular aspect is described in more detail in the following paragraphs.

In an exemplary configuration, virtual disk parser 404 can be configured to execute reclamation operations when a virtual disk extent is fully covered by a TRIM command. Or put another way, virtual disk parser 404 can unlink virtual disk extents from the virtual disk file in response to receipt of a TRIM command that defines a range of virtual disk sectors that identifies all of the sectors in the virtual disk extent. In the same or an alternative embodiment, when a TRIM command is received that covers a portion of a virtual disk extent, virtual disk parser 404 can determine what portion of the virtual disk file corresponds to the trimmed sectors and send a TRIM command for the portion of the virtual disk file to storage device 106. In this example, the underlying file system, e.g., virtualization system file system 408, storage server file system 504, or computer system file system 514 can translate the offsets of the TRIM command and send the translated offsets to storage device 106, reclaim space directly via internal data structure updates, or clear data from caches.

In the same or another embodiment, when a TRIM command is received that covers a portion of a virtual disk extent, virtual disk parser 404 can be configured to store information that indicates what sectors have been the subject of the TRIM command and whether the TRIM command was a free space trim or not. In the instance that the remainder of the virtual disk extent is trimmed, virtual disk parser 404 can de-allocate the virtual disk extent from the virtual disk file.

When de-allocating virtual disk extents, virtual disk parser 404 can associate the virtual disk extent with state information that describes how read operations directed to the virtual disk extent can be handled. Table 1 illustrates exemplary state information that virtual disk parser 404 can associate with virtual disk extents and use to optimize the reclamation of the virtual disk file. The ability to reclaim a virtual disk extent can be accomplished in one example by using two states (described and not described); however, since the bit pattern stored in virtual disk file 702 is not typically erased when the data is deleted, additional states can be used to determine when space selected to describe a virtual disk extent needs to be cleared before it can be reused or if it can be reused without overwriting the data previously stored therein. One reason for why the data is not erased upon deletion is that it costs processor cycles to erase data and since some storage devices are configured to perform write operations on a per-block basis, it is more efficient to erase data when over-writing with new data. The following states are exemplary and the disclosure is not limited to using states that are defined by the following table.

TABLE 1

| State | Description |
|---|---|
| Mapped | This state indicates that the virtual disk extent is linked to the virtual disk file. |
| Transparent | This state indicates that the virtual disk extent is defined by a different virtual disk file. |
| Zero | This state indicates that the virtual disk extent is not described by the virtual disk file. In addition, this state indicates that the virtual disk extent is defined as zero and that the zeros are meaningful. |
| Unmapped | This state indicates that the virtual disk extent is not described by the virtual disk file. In an embodiment, this state can include sub-states anchored and unanchored. |
| Uninitialized | This state indicates that the virtual disk extent is not described by the virtual disk file and that the virtual disk extent is defined as free space. In an embodiment, this state can also include sub-states anchored and unanchored. |

Referring to Table 1 in conjunction with FIG. 7, the first state listed is the "mapped" state, which indicates that the virtual disk extent is described by a section of virtual disk file 702. For example, virtual disk extent 0 is an example virtual disk extent that is illustrated as being in the "mapped" state.

Continuing with the description of Table 1, a virtual disk extent can be associated with state information that indicates that the virtual disk extent is "transparent," that is, the virtual disk extent is described by a different virtual disk file. In the instance that a read operation is received by virtual disk parser 404 to a virtual disk extent in the transparent state, virtual disk parser 404 can refer to a different virtual disk file and check its allocation table to determine how to respond to the read. In an instance that virtual disk parser 404 receives a write to the virtual disk extent, virtual disk parser 404 can transition the virtual disk extent from the "transparent" state to the "mapped" state.

Continuing with the description of Table 1 in conjunction with FIG. 7, a virtual disk extent can also be associated with the "unmapped" state. In this example, the virtual disk extent is not described by virtual disk file 702 nor is it described by any other virtual disk file in a chain. In this example, the unmapped state can be used to describe a virtual disk extent that was subject to a TRIM command that did not indicate that file system 414 would secure access to the virtual disk extent. Or put another way, the TRIM command used to transition this virtual disk extent to this state was a standard TRIM command. In the instance that the virtual disk extent is in the unmapped state and an IO job indicative of a read to the extent is received, virtual disk parser 404 can respond with zeros, the zero token, ones, a token representing all ones, or a non-information disclosing bit pattern, e.g., all zeros, all ones, or a randomly generated pattern of ones and zeros. In this example, if a section of virtual disk file 702 is allocated to back a virtual disk extent in this state, virtual disk parser 404 can write a non-information disclosing bit pattern to the section of virtual disk file 702 before allocating it or select a section that already includes a non-information disclosing bit pattern to describe the virtual disk extent. Virtual disk extent 6 of FIG. 7 is indicated as in the unmapped state.

In an embodiment, the data defining an unmapped or uninitialized extent can be kept and the unmapped or uninitialized state can include two sub-states: anchored, which means that the data is still present within virtual disk file 702, and unanchored, which means that the data may or may not be kept. In instances where these sub-states are used, virtual disk parser 404 can transition an unmapped but anchored extent to mapped by allocating the section or sections that store the data without zeroing the section or sections. Similarly, while virtual disk parser 404 is configured to treat uninitialized extents as if they were unmapped for at least a portion of virtual disk 402, virtual disk parser 404 can avoid zeroing an uninitialized but anchored extent during transition of that extent to mapped, by allocating the section or sections that store the data without zeroing the section or sections.

Table 1 additionally describes a "zero" state. In this example, the virtual disk extent is not described by virtual disk file 702 nor is it described by any other virtual disk file in a chain; however, the virtual disk extent is required to read as all zeros. In this example, the zero state can be used to describe a virtual disk extent that was subject to either type of TRIM command or to describe a virtual disk extent that a program has written all zeros to. For example, suppose a deletion utility program wrote all zeros to virtual disk extent 4 to ensure that the data it previously stored was completely overwritten. In the instance that the virtual disk extent is in the zeroed state, and an IO job indicative of a read to the extent is received, virtual disk parser 404 can respond to with zeros or the zero token (in an offload read operation). In the instance that a write is directed to a virtual disk extent in this state, virtual disk parser 404 can zero a section of virtual disk file 702 and use it to describe the virtual disk extent or select a section of virtual disk file 702 that is already zero and allocate it to back the virtual disk extent. In this embodiment, zeroed space could be tracked using a data structure or virtual disk file 702. The data structure could be updated periodically, when virtual disk file 702 is opened, when virtual disk file 702 is closed, etc. A read from an extent in the unmapped or uninitialized states may optionally cause virtual disk parser 404 to transition the extent to the zero state in a configuration where virtual disk parser 404 is configured to provide sector stability for extents in the unmapped or uninitialized states.

Table 1 also describes a state called the "uninitialized" state. The uninitialized state indicates that the virtual disk extent is not described by virtual disk file 702 and file system 414 is securing access to the virtual disk extent. That is, file system 414 is configured to prevent user applications from reading sectors within this virtual disk extent. In this example, the uninitialized state can be used to describe a virtual disk extent that was subject to a free space TRIM command. In the instance that the virtual disk extent is in the uninitialized state and an IO job indicative of a read to the extent is received, virtual disk parser 404 can respond with any data, i.e., a bit pattern from almost anywhere else in virtual disk file 702, zeros, ones, a non-information disclosing bit pattern, etc., because virtual disk parser 404 is not providing security for the virtual disk extent, beyond the requirement that only virtual disk payload data and non-security-impacting metadata may be exposed to the virtual disk client. In the instance that a write is directed to a virtual disk extent in this state, virtual disk parser 404 can simply allocate a section of the virtual disk file 702 without having to alter any data that may be stored within the section. Consequently, this state is the most advantageous because space can be allocated within the virtual disk file without clearing it beforehand. Virtual disk extent 5 of FIG. 7 is indicated as in the uninitialized state and virtual disk file 702 is not backing the virtual disk extent.

Once state information is associated with each virtual disk extent, virtual disk parser 404 can be configured to provide additional information to an administrator or the like about how virtual disk 402 is arranged. In an example embodiment, virtual disk parser 404 can be configured to respond to offset queries that include certain parameters based on the state information. For example, a user can issue a query to iterate, starting at a given byte offset, through virtual disk 402 and locate ranges that satisfy a specific criteria such as "mapped," "unmapped," "transparent," etc. In addition, a user can select how "deep" the query should go to take into account differencing virtual disk files. For example, and referring to FIG. 7, a user could set a depth of 2 and execute a query. In response, virtual disk parser 404 will execute the query on the last two virtual disk files in a chain, e.g., virtual disk files 610 and 612. Specific queries can include a query to obtain the next non-transparent range(s), the next non-zero range(s), the next defined range(s), the next initialized range(s), etc. Briefly, a query for the next defined range can be configured to return the next range(s) which contain defined data (e.g., sectors in the mapped or zeroed state, with transparent sectors resolving to the parent virtual disk file's state for that sector). A query for the next initialized range(s) can return the next range(s) which contain data in a state other than the uninitialized state, with transparent sectors resolving to the parent virtual disk file's state for that sector.

Figure 8:
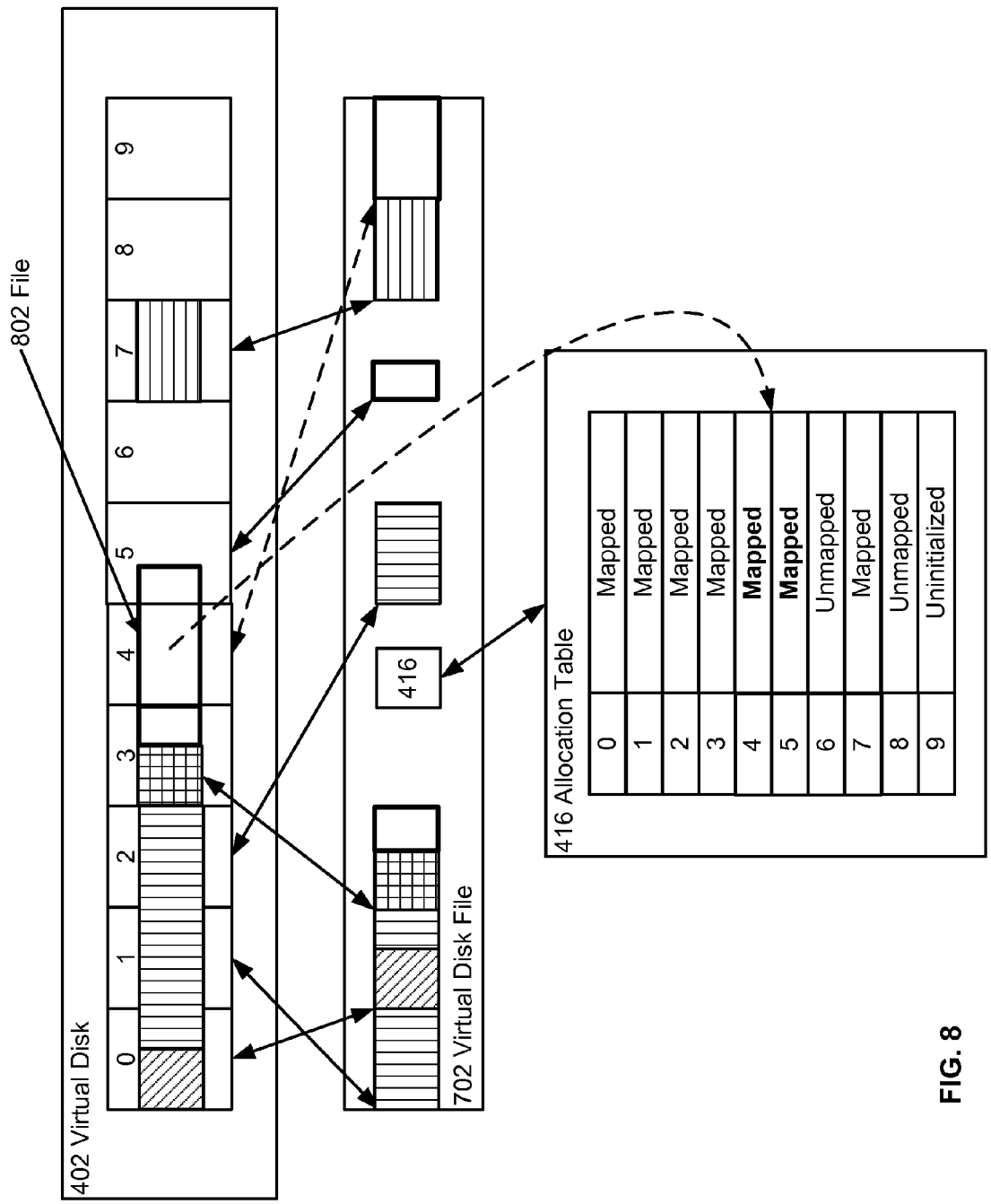
FIG. 8 depicts a high-level illustration of the relationship between a virtual disk and a virtual disk file.

Turning now to FIG. 8, it illustrates a specific example of how virtual disk parser 404 can transition virtual disk extents from one state to another in response to a file or other data being saved to virtual disk 402. For example, suppose that a user uses a database management program within virtual machine 410 and creates a database. The user can save the database in a file and file system 414 can determine where on virtual disk 402 to save file 802. File system 414 can issue one or more disk writes to write file 802 to, for example, sectors that fall within virtual disk extents 3-5. In this example, virtual disk extent 3 is "mapped" and virtual disk parser 404 can write the first portion of file 802 to the section identified by allocation table 416.

Virtual disk extents 4 and 5, on the other hand, are in the "zero" and "uninitialized" state. In this example, virtual disk parser 404 can select an unused section of virtual disk file 702 to back virtual disk extent 4 and determine that virtual disk extent 4 is in the zeroed state. In response to this determination, virtual disk parser 404 can zero the section that is going to be used to describe virtual disk extent 4 or locate a section which is already all zeros. After locating a zeroed section or the process of zeroing the section is complete, virtual disk parser 404 can generate information that identifies the virtual disk file byte offset indicative of the first byte of the section that defines where virtual disk extent 4 is described in virtual disk file 702 and store it in allocation table 416. Virtual disk parser 404 can then change the state information associated with virtual disk extent 4 to indicate that it is "mapped." Then the portion of the write to extent 4 can be written to the located section.

Alternatively, for a portion of a write which covers an entire extent of the virtual disk currently in the zero state, a located section of the virtual disk file may be chosen, the portion of the write may be issued to the section, and upon completion of the write the virtual disk parser 404 can then change the state information associated with the virtual disk extent to indicate that the extent is "mapped". Alternatively, for a portion of a write which only covers part of a virtual disk extent currently in the zero state, a located section of the virtual disk file may be chosen, the portion of the write may be issued to the section, a zeroing write may be issued to the remainder of the section, and on completion of the write the virtual disk parser 404 can then change the state information associated with the virtual disk extent to indicate that the extent is "mapped". Those skilled in the art will recognize that the given ordering of writes may be enforced using flush or write-through writes, such as force-unit-access writes.

Similarly, virtual disk parser 404 can select an unused section of virtual disk file 702 to back virtual disk extent 5 and determine that virtual disk extent 5 is in the uninitialized state by consulting allocation table 416. In response to this determination, virtual disk parser 404 can allocate the section to describe virtual disk extent 5 without modifying the contents of the selected section. Virtual disk parser 404 can generate information that identifies the virtual disk file byte offset indicative of the first byte of the section, which indicates where virtual disk extent 4 is described in virtual disk file 702 and store the file byte offset of the section in allocation table 416. Virtual disk parser 404 can then change the state information associated with virtual disk extent 5 to indicate that it is "mapped."

Figure 9:
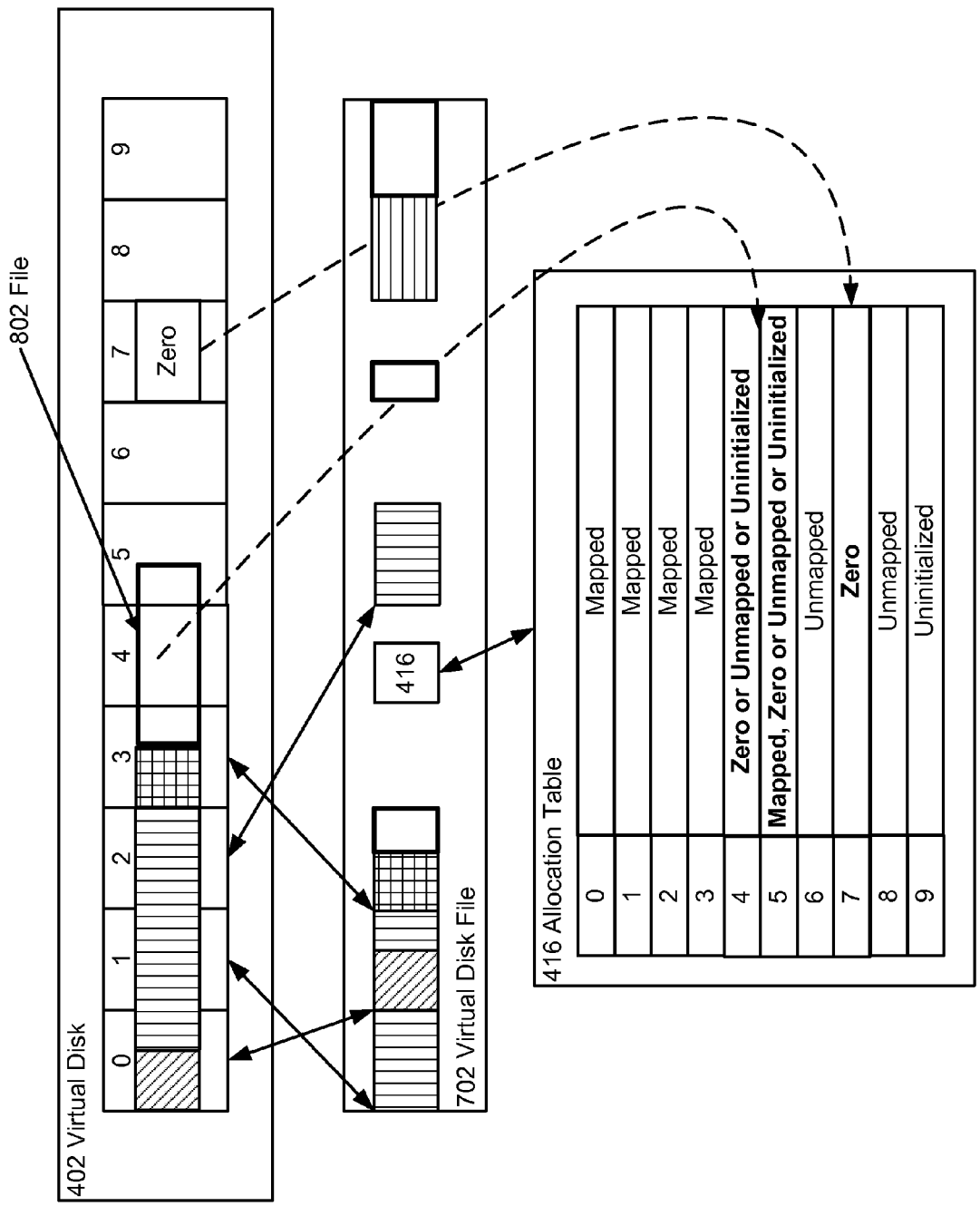
FIG. 9 depicts a high-level illustration of the relationship between a virtual disk and a virtual disk file.

FIG. 9 illustrates another specific example of how virtual disk parser 404 can transition virtual disk extents from one state to another in response to a deletion operation on file 802 and an operation that zeros the contents of virtual disk extent 7. For example, a user may have deleted file 802 and file system 414 may have issued a TRIM command. In this example, virtual disk parser 404 may receive a TRIM command that includes a range of virtual disk sectors that fully cover virtual disk extents 4 and 5 and partially cover virtual disk extent 3. In response to a determination that virtual disk extent 4 and 5 are fully trimmed, virtual disk parser 404 can be configured to remove the linking from allocation table 416 and transition virtual disk extent 4 to a state that indicates that virtual disk file 702 is not backing this virtual disk extent. As shown by the allocation table entry for virtual disk extent 4, the state virtual disk parser 404 transitions the virtual disk extent to depends on what states virtual disk parser 404 is configured to use and whether or not file system 414 issues a free space TRIM command or a standard TRIM command. For example, virtual disk parser 404 may be configured to use two states: mapped and zero to describe virtual disk extents. Alternately, virtual disk parser 404 may be configured to use three states: mapped, zero, unmapped to describe virtual disk extents. Alternately, virtual disk parser 404 may be configured to use four states: mapped, zero, unmapped, and uninitialized. The distinction between unmapped and uninitialized corresponds to the distinction between standard TRIM and free space TRIM. If the parser is configured to not use the uninitialized state, then a free space TRIM is treated as a normal TRIM. As shown by the figure, the parts of file 702 are still being stored in virtual disk file 702 since it is inefficient to clear them from virtual disk file 702.

Since virtual disk extent 5 was partially covered by the TRIM, virtual disk parser 404 can handle this extent in one of a variety of ways. In one configuration, virtual disk parser 404 may leave extent 5 in the mapped state. In this configuration, virtual disk parser 404 may transition extents when TRIM information is received for an entire extent. Alternatively, virtual disk parser 404 may track TRIM information that partially covers extents in the hope that more TRIM information is received that provides an indication that space describing the extent can be de-allocated.

Similarly, virtual disk extent was also partially covered by the TRIM. In this example, virtual disk parser 404 may leave it in the mapped state and can also be configured to send TRIM information that describes the part of virtual disk file 702 that is no longer in use to the underlying file system, e.g., virtualization file system 408, storage server file system 504, or computer system file system 514.

In addition to the deletion of file 802, FIG. 9 shows an example where virtual disk extent 7 was zeroed. Virtual disk parser 404 can scan an IO job issued by file system 414 that indicates that the entire range of virtual disk extent 7 is zeroed. In response to this determination, virtual disk parser 404 can be configured to remove the linking from extent allocation table 416 and transition virtual disk extent 7 to the zero state. As shown by the figure, the previous contents of virtual disk extent 7 are still being stored in virtual disk file 702.

Figure 10:
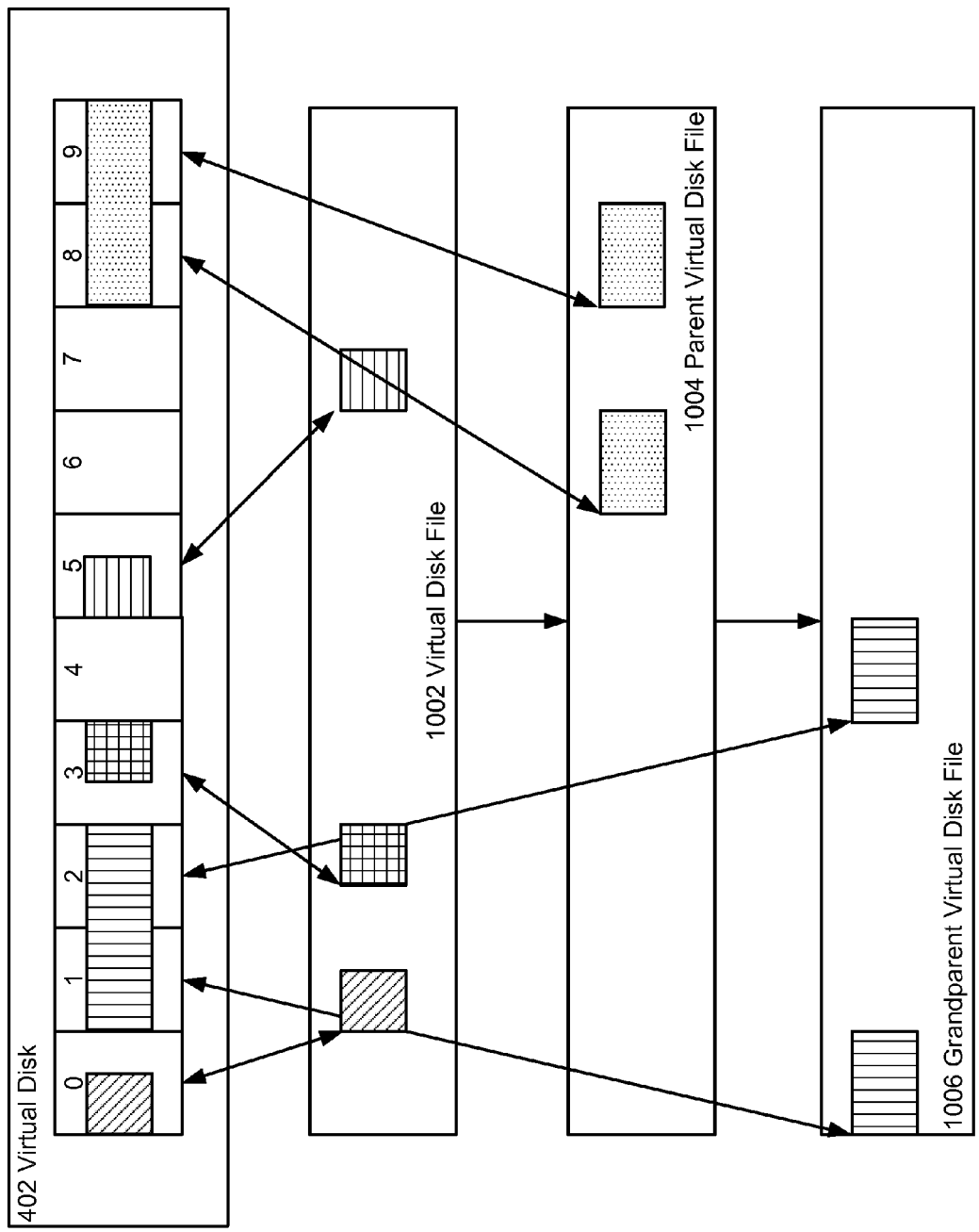
FIG. 10 depicts a high-level illustration of the relationship between a virtual disk and a virtual disk file.

Turning to FIG. 10, it illustrates virtual disk 402 described at least in part by a group of virtual disk files 1002, 1004, 1006, which could be similar to the chain of virtual disk files defined by virtual disk file 608, 604, and 600. In this exemplary embodiment, the data that represents virtual disk 402 is broken up across multiple virtual disk files. In this exemplary embodiment, when virtual disk parser 404 attempts to read virtual disk extent 1 and 2, virtual disk parser 404 can access the allocation table for virtual disk file 1002 and determine that these extents are transparent. Next, virtual disk parser 404 can access the allocation table for virtual disk file 1004 and determine that these extents are transparent. Finally, virtual disk parser 404 can access allocation table for grandparent virtual disk file 1006 and determine that these virtual disk extents are defined.

The following are a series of flowcharts depicting operational procedures. For ease of understanding, the flowcharts are organized such that the initial flowcharts present implementations via an overall "big picture" viewpoint and subsequent flowcharts provide further additions and/or details that are illustrated in dashed lines. Furthermore, one of skill in the art can appreciate that the operational procedure depicted by dashed lines are considered optional.

Figure 11:
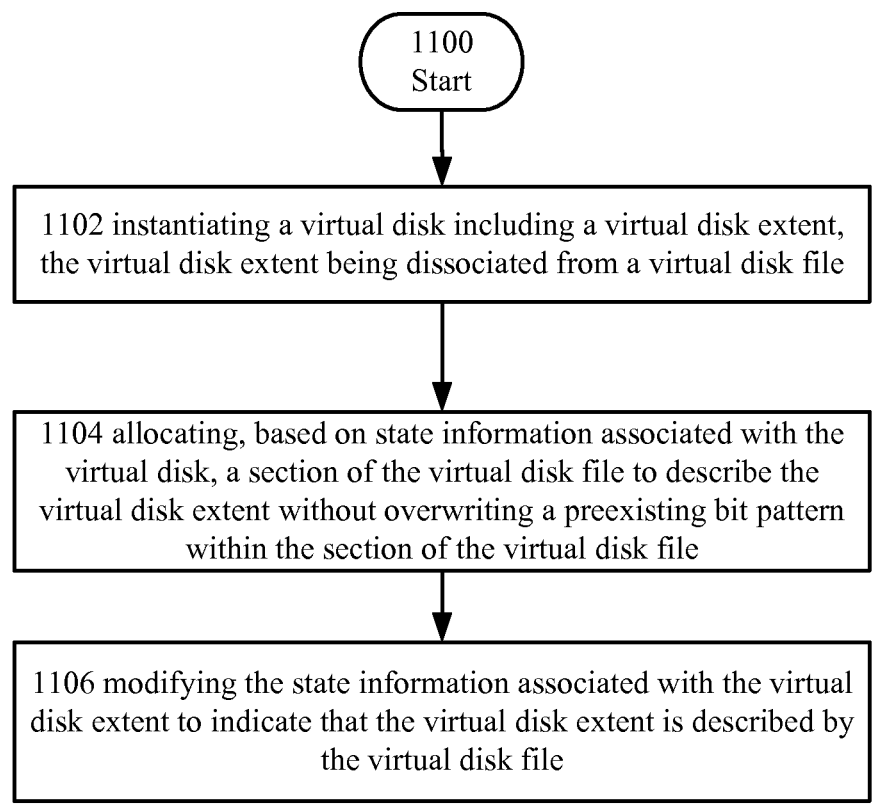
FIG. 11 depicts an operational procedure that can be implemented in a computer-readable storage medium and/or executed by a computer system.

Referring now to FIG. 11, it illustrates an operational procedure for reclaiming space within a virtual disk file including the operations 1100, 1102, 1104, and 1106. Operation 1100 begins the operational procedure and operation 1102 shows instantiating a virtual disk including a virtual disk extent, the virtual disk extent being dissociated from a virtual disk file. Turning briefly to FIG. 4, FIG. 5A or FIG. 5B, virtual disk 402 can be instantiated by virtual disk parser 404, e.g., executable instructions and associated instance data, that exposes the data stored within one or more virtual disk files as a logical hard drive, which can be configured to handle read/write operations from file system 414 by emulating the behavior of a hard drive. Virtual disk file 406 (which could be one or more files as illustrated in FIG. 6) can store what is typically found on a physical hard drive, i.e., disk partitions, file systems, etc. Turning to FIG. 7, virtual disk 402 is shown including a plurality of extents, some of which are dissociated from any sections of virtual disk file 702.

In a specific example, suppose the extents are blocks. In this example, allocation table 416, which can be loaded from one or more sections in the virtual disk file 702 into random access memory, can be used to store information that links virtual disk blocks in virtual disk 402 to extent sized (e.g., block sized) sections of virtual disk file 702. Allocation table 416 can also store state information for each virtual disk block in virtual disk 402. Virtual blocks that potentially include non-zero data can be associated with state information that indicates that the block is in the mapped state. That is, a section of virtual disk file 702 has been allocated to describe, i.e., store data for, a block of virtual disk 402. Virtual disk blocks 0-3 and 7 are examples of blocks in this state. As shown by the figure, virtual disk blocks 4 and 5, 6, 8 and 9 may be valid virtual disk blocks; however, these virtual disk blocks may not have any space allocated within virtual disk file 702. Since file system 414 may write to these blocks, in an exemplary embodiment, these virtual disk blocks can be associated with information that can be used by virtual disk parser 404 to determine how to respond to read and/or write operations to them.

Referring briefly back to FIG. 11, operation 1104 shows that a computer system can additionally include circuitry for allocating, based on state information associated with the virtual disk, a section of the virtual disk file to describe the virtual disk extent without overwriting a preexisting bit pattern within the section of the virtual disk file. For example, and returning to FIG. 8, virtual disk parser 404 can receive an IO job to write to a portion of the virtual disk extent. In response to receipt of the write IO job, virtual disk parser 404 can check allocation table 416 and determine that space within virtual disk file 702 has not been allocated to describe the virtual disk extent and allocate a section of virtual disk file 406 to back the virtual disk extent. Thus, the data written by file system 414 to the virtual disk extent will be stored by virtual disk parser 404 in a section of virtual disk file 702.

In this example, virtual disk parser 404 may not overwrite any data already stored in the section of virtual disk file 702

(by writing all zeros, ones, or any other non-information disclosing bit pattern) prior to using it to describe the virtual disk extent based on the state information in allocation table 416. In an exemplary configuration, the state information could indicate that file system 414 is securing access to this virtual disk extent because the virtual disk extent is covered by file system free space. In a specific example, the state information could indicate that the virtual disk extent is in the "uninitialized" state. Allocating the virtual disk extent without clearing it provides an added benefit of saving processor cycles and IO jobs that would be otherwise used to overwrite the section of virtual disk file 702.

In a specific example of operation 1104, and turning to FIG. 7, suppose that an extent is a block and file system 414 sends an IO job to virtual disk 402 to write a bit pattern indicative of file 802 to virtual disk blocks 3-5. In response to receipt of such an IO job, virtual disk parser 404 can determine that virtual disk block 5 is not backed by any sections of virtual disk file 406 and that it is uninitialized. In response to this determination, virtual disk parser 404 can be configured to allocate a section of virtual disk file 702 to describe virtual disk block 5 and write a portion of the bit pattern indicative of file 802 therein without overwriting data that was previously stored in the portion of the section not covered by the IO job.

Turning again to FIG. 11, operation 1106 shows that the computer system can additionally include circuitry configured to modify the state information associated with the virtual disk extent to indicate that the virtual disk extent is described by the virtual disk file. For example, and turning back to FIG. 8, virtual disk parser 404 can modify, e.g., overwrite in memory, the state information associated with virtual disk extent 5 to reflect that virtual disk file 702 is describing the virtual disk extent. In one configuration, the write and the modification of the state information can occur concurrently. For example, virtual disk parser 404 can store information in allocation table 416 that indicates that virtual disk extent 5 is "mapped." Consequently, subsequent read operations directed to sectors of virtual disk extent 5 will be handled by virtual disk parser 404 by returning the bit pattern stored at the byte offset identified in allocation table 416. Virtual disk parser 404 can concurrently write data, e.g., a bit pattern associated with a write operation that triggered this procedure, to the section of virtual disk file 702 allocated to describe the virtual disk extent and issue an IO job to a write the bit pattern to the section of virtual disk 702 to virtualization system file system 408, storage server file system 504, or computer system file system 514. At some point in time, such as prior to completion of a subsequently issued flush command, the bit pattern will be persisted in persistent storage unit 460.

Figure 12:
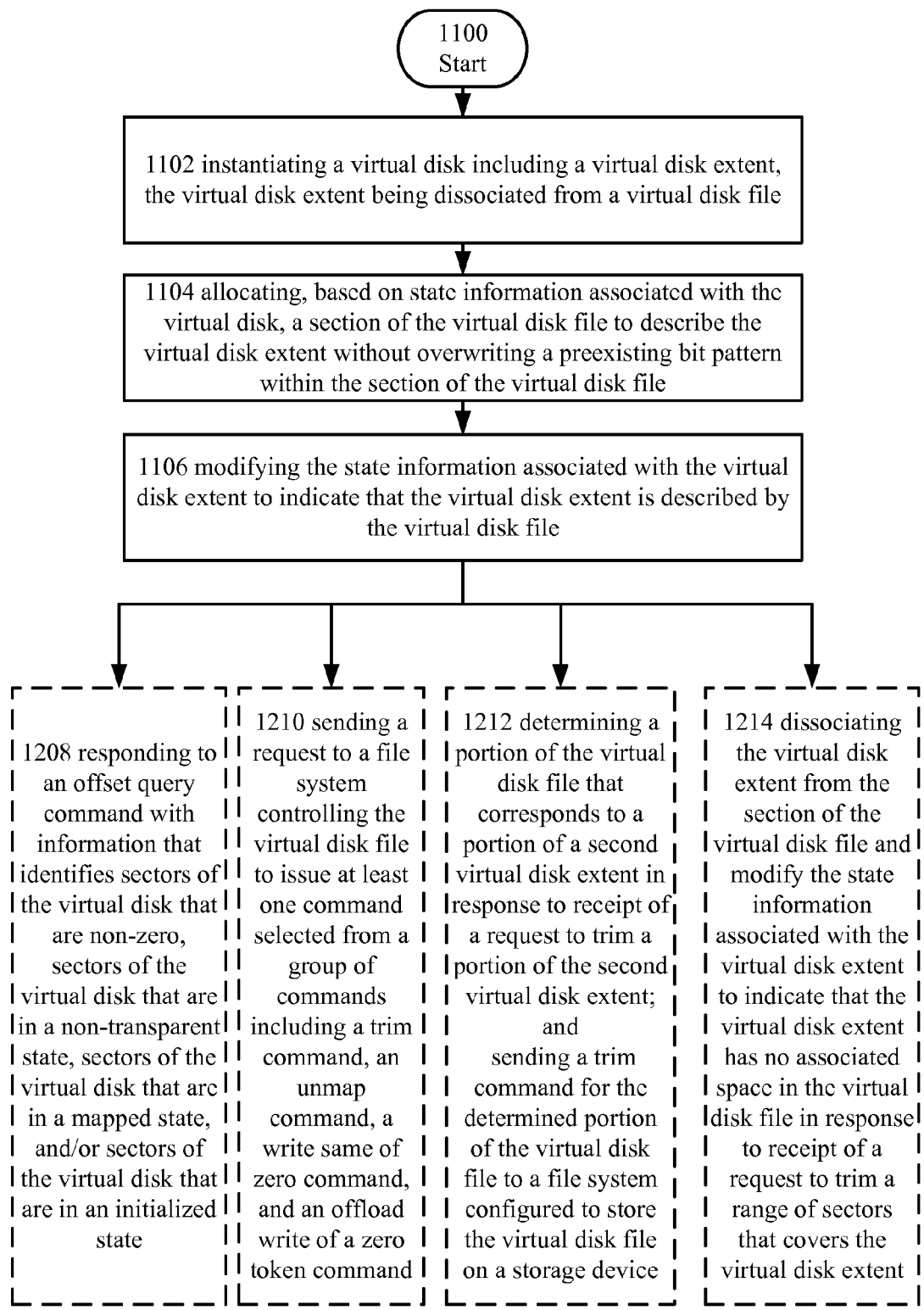
FIG. 12 depicts additional operations that can be executed in conjunction with those illustrated by FIG. 11.

Turning now to FIG. 12, it shows additional operations that can be executed in conjunction with those illustrated by FIG. 11. Turning to operation 1208, it indicates that the computer system can include circuitry for responding to an offset query command with information that identifies sectors of the virtual disk that are non-zero, sectors of the virtual disk that are in a non-transparent state, sectors of the virtual disk that are in a mapped state, and/or sectors of the virtual disk that are in an initialized state. For example, virtual disk parser 404 can be configured to receive a command to generate information about virtual disk 402 such as the next byte offset on the virtual disk, given a starting byte offset, that is in a non-transparent state, i.e., a state other than transparent, a mapped state, i.e., sectors of the virtual disk 402 that include data in virtual disk file 406, a defined state, i.e., sectors of the virtual disk 402 that are mapped or zero, and/or an initialized state, i.e., a state other than uninitialized. The command can be depth-limited, in that only a specified number of virtual disk files are examined, with any ranges remaining transparent after the specified number of virtual disk files are examined reported back to the requestor in addition to ranges indicated by the state query, regardless of which state query was requested. In response to receipt of such a command, virtual disk parser 404 can start at the initial byte offset on virtual disk 402 and build a response range or set of ranges until the range associated with the command is detected and return the desired information.

Continuing with the description of FIG. 12, operation 1210 shows sending a request to a file system controlling the virtual disk file to issue at least one command selected from a group of commands including a trim command, an unmap command, a write same of zero command, and an offload write of a zero token command. Referring back to FIG. 4, FIG. 5A, or FIG. 5B, virtual disk parser 404 can be configured to issue a request to file system 414. The request in this example can be for file system 414 to issue a TRIM command. For example, virtual disk parser 404 can issue one or more requests to file system 414 periodically, soon after instantiation of virtual disk 402, and/or prior to shutting down, hibernating, etc., virtual machine 410. In response to such a request, file system 414 can determine what sectors of virtual disk 402 it is no longer using and send one or more TRIM commands identifying these unused sectors to virtual disk parser 404. Virtual disk parser 404 may thereby receive trim information such as a list of ranges of sectors that are no longer in use by file system 414 and whether file system 414 is preventing reads from the ranges of sectors in order to secure access to those sectors. Virtual disk parser 404 can receive the information and transition virtual disk extents covered by the ranges into states where space within virtual disk file 702 can be reclaimed.

Continuing with the description of FIG. 12, operation 1212 shows that the computer system can include circuitry for determining a portion of the virtual disk file that corresponds to a portion of a second virtual disk extent in response to receipt of a request to trim a portion of the second virtual disk extent; and circuitry for sending a trim command for the determined portion of the virtual disk file to a file system configured to store the virtual disk file on a storage device. For example, and referring to FIG. 8, file system 414 may issue a TRIM command that identifies a portion of a virtual disk extent, e.g., the TRIM command may only identify a range of sectors that corresponds to a part of the sectors that form one or more virtual disk blocks. In a specific example, suppose file system 414 trims the space used to store file 802. As such, the trim command may only identify a portion of the sectors that constitute virtual disk extent 3. In this example, virtual disk parser 404 can determine that the range of sectors covers a subsection of the virtual disk extent and use mapping information in allocation table 416 to determine the portion of virtual disk file 702 that corresponds to the trimmed sectors of the virtual disk extent. Virtual disk parser 404 can issue a request to trim the portion of virtual disk file 702 that corresponds to the trimmed sectors of the virtual disk extent to virtualization system file system 408 or storage server file system 504. Virtualization system file system 408 or storage server file system 504 may be configured to use the trim command and benefit from it by trimming a portion of the sectors backing virtual disk file 406, flushing data from a cache, clearing internal buffers, etc.

Alternatively, virtual disk parser 404 can store information indicating that a portion of the virtual disk extent was trimmed as well as information that indicates whether it was a free space trim or not. As guest operating system 412 or operating system 508 runs, it may eventually zero or trim the remainder of the virtual disk extent. In response to this occurring, virtual disk parser 404 can determine to transition the virtual disk extent into a state where it is not described by virtual disk file 702 and select a state based on how the different portions of the virtual disk extent were trimmed or zeroed. Virtual disk parser 404 can be configured to select the most restrictive state to transition a virtual disk extent when different portions of a virtual disk extent can be placed in different non-described states, where the zero state is the most restrictive, uninitialized is the least restrictive state, and unmapped is somewhere in between. For example, if a first portion is zeroed and the remainder is uninitialized, virtual disk parser 404 can transition the entire virtual disk extent to the zeroed state.

Continuing with the description of FIG. 12, operation 1214 illustrates that computer system 400 can additionally include circuitry configured to de-allocate the virtual disk extent from the section of the virtual disk file and modify the state information associated with the virtual disk extent to indicate that the virtual disk extent has no associated space in the virtual disk file in response to receipt of a request to trim a range of sectors that covers the virtual disk extent. For example, and turning to FIG. 9, virtual disk parser 404 can remove the linking in allocation table 416 that ties a virtual disk extent to a section of virtual disk file 702. This operation has the effect of dissociating the virtual disk extent from virtual disk file 702. In addition to removing the link, virtual disk parser 404 can modify the state information associated with the virtual disk extent to indicate that the extent has no associated space within virtual disk file 702, i.e., virtual disk parser 404 can place the virtual disk extent into the unmapped, uninitialized, or zeroed state.

Virtual disk parser 404 can remove the linking and update the state information in response to receipt of a request to trim or zero sectors of the virtual disk extent. For example, a request to trim or zero sectors can be received that identifies a range of byte offsets that could cover one or more virtual disk extents. In response to receipt of such an IO job, virtual disk parser 404 can determine that the request covers the sectors of the virtual disk extent and execute the aforementioned operations for removing the linking and updating the state information.

In a specific example, suppose that the IO job indicates that the trim is a free space trim. For example, a user may have deleted file 802, which is stored as a bit pattern across virtual disk extents 3-5 and file system 414 may indicate that the space is no longer being used by file system 414. In response to receipt of a free space TRIM command, virtual disk parser 404 can access allocation table 416 and determine that file system 414 has trimmed a portion of extent 3, 5 and all of extent 4. In this example, virtual disk parser 404 can remove the link mapping virtual disk extent 4 to virtual disk file 702 and modify the state information associated with virtual disk extent 4 to indicate that the virtual disk extent is uninitialized. This section of virtual disk file 702 can now be reused to back other virtual disk extents. In addition, virtual disk parser 404 can determine that virtual disk extent 3 and 5 are the subject of a partial TRIM command. In this example, virtual disk parser 404 can use allocation table 416 to discover the virtual disk file byte offsets that describe the portion of virtual disk file 702 that describes the trimmed portions of virtual disk extent 3 and 5 and issue a TRIM command describing the virtual disk file byte offsets to virtualization system file system 408, storage system file system 504, or computer system file system 514.

In another specific example, suppose that the IO job issued by file system 414 indicates that file 802 was zeroed. For example, file 802 could be a database file storing sensitive information such as credit card numbers and an administrator determined to zero out the contents of the file by writing all zeros to it by issuing a write command with an all-zero buffer, which will write zeros over the data existing in file 802. In response to receipt of such an IO job, virtual disk parser 404 can be configured to determine that virtual disk extent 4 has been zeroed and that this extent can be reclaimed. In this example, virtual disk parser 404 can remove the link mapping virtual disk extent 4 to virtual disk file 702 and modify the state information associated with virtual disk extent 4 to indicate that the virtual disk extent is zeroed. This section of virtual disk file 702 can now be reused to back other virtual disk extents and virtual disk parser 404 can respond to subsequent read operations to virtual disk extent 4 by replying with all zeros.

In another specific example, a user may write bulk zeros to initialize the state of file 802, rather than to overwrite data stored therein. In this example, a command such as a TRIM, in the instance that virtual disk parser 404 repots that trimmed sections read as zero, UNMAP, when virtual disk parser 404 reports that unmapped regions are zero, WRITE SAME of zero, and/or an offload write of a zero token can be used to transition an extent to the zeroed state.

In a specific example, suppose that the IO job indicates that the trim is a standard trim. For example, a user may have deleted file 802, which is stored as a bit pattern across virtual disk extents 3-5; however, the TRIM command may not indicate whether or not the space is being used by file system 414. In response to receipt of a standard TRIM command, virtual disk parser 404 can access allocation table 416 and determine that file system 414 has trimmed a portion of extent 3, 5 and all of extent 4. In this example, virtual disk parser 404 can remove the link mapping virtual disk extent 4 to virtual disk file 702 and modify the state information associated with virtual disk extent 4 to indicate that the virtual disk extent is unmapped or zero. This section of virtual disk file 702 can now be reused to describe other virtual disk extents. In addition, virtual disk parser 404 can determine that virtual disk extent 3 and 5 are the subject of a partial TRIM command. In this example, virtual disk parser 404 can use allocation table 416 to discover the virtual disk file byte offsets that make up the portion of virtual disk file 702 that describes the trimmed portions of virtual disk extent 3 and 5 and issue a TRIM command specifying the virtual disk file byte offsets, typically in the form of ranges, to virtualization system file system 408.

Figure 13:
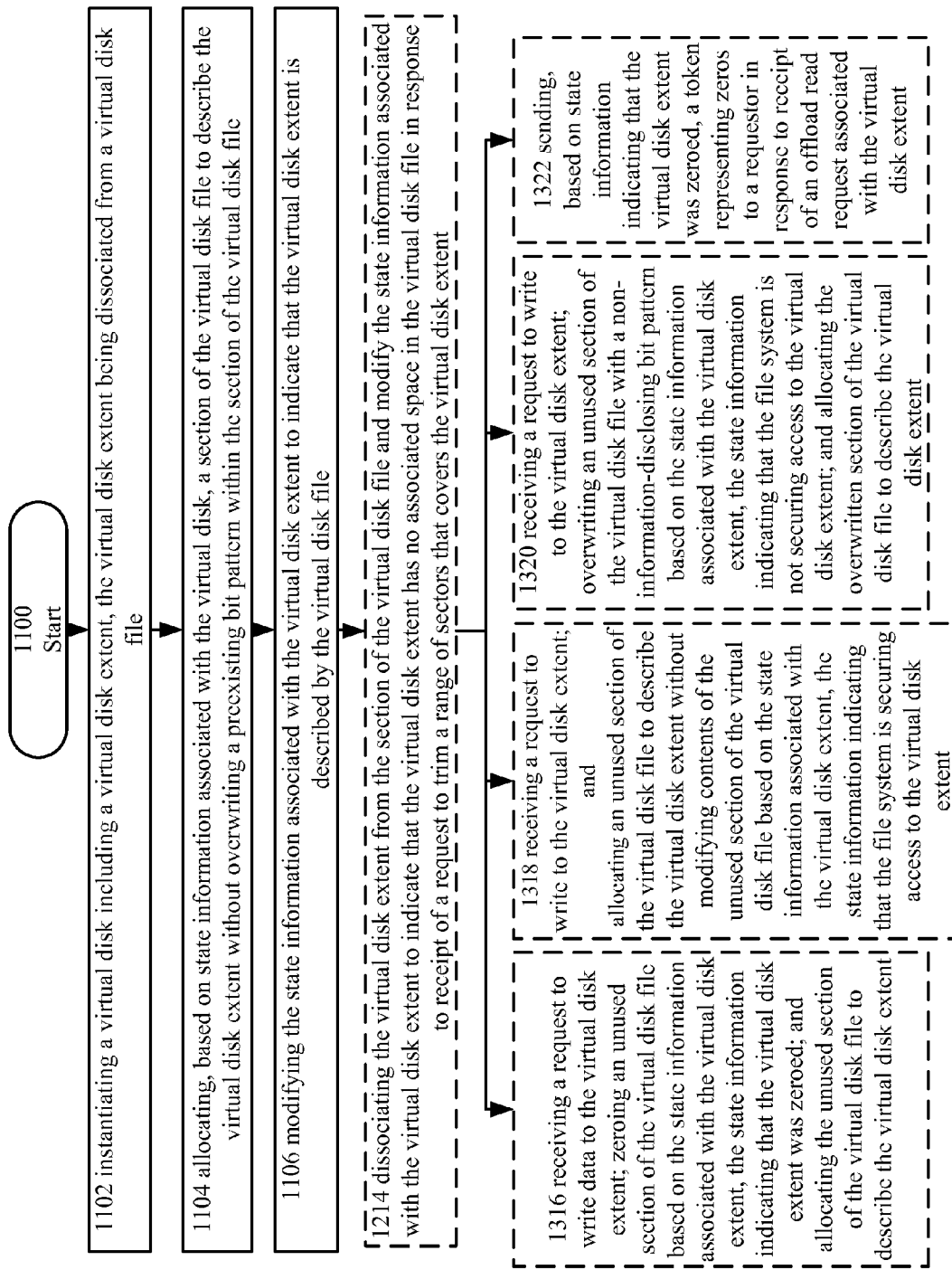
FIG. 13 depicts additional operations that can be executed in conjunction with those illustrated by FIG. 12.

Referring now to FIG. 13, which illustrates additional operations that can be executed in addition to operation 1214 of FIG. 12. Operation 1316 illustrates that a computer system can include circuitry for receiving a request to write data to the virtual disk extent; circuitry for zeroing an unused section of the virtual disk file based on the state information associated with the virtual disk extent, the state information indicating that the virtual disk extent was zeroed; and circuitry for allocating the unused section of the virtual disk file to describe the virtual disk extent. Referring to FIG. 9 for context, virtual disk parser 404 can receive a request to write data to the virtual disk extent, e.g., virtual disk extent 4 of FIG. 9, which in this example is associated with state information that indicates that the virtual disk extent is zeroed. For example, when virtual disk extent 4 was de-allocated virtual disk parser 404 could have determined that the virtual disk extent was zeroed, i.e., an application wrote all zeros to file 602 by using an offload write of a well-known zero token.

In response to determining that the virtual disk extent is in the zeroed state, virtual disk parser 404 can identify an unused section of virtual disk file 702, i.e., a section that is not actively being used to describe a virtual disk extent and not actively being used to store any allocated metadata, and use the section to back the virtual disk extent. The virtual disk parser further insures that any reads from not-yet-written sectors of the newly allocated extent read as all zeros. The virtual disk parser 404 can write payloads of IO write jobs to the section; update state information to indicate that the virtual disk extent is mapped; and update information in allocation table 416 to describe the virtual disk file byte offset that identifies the beginning of the section used to store virtual disk extent 4. The virtual disk parser 404 also can create a log entry, which insures that in the event of system failure and re-start prior to writes being flushed, not-yet-written sectors of the newly allocated extent still read as all zeros, and written sectors of the newly allocated extent read as either all zeros or the written data. Upon the first subsequent flush command, virtual disk parser 404 insures that a system failure subsequent to completion of the flush will result in reads from previously written sectors of the newly allocated extent reading the data that was written, and reads from not-yet-written sectors of the newly allocated extent reading zeros.

Continuing with the description of FIG. 13, operation 1318 shows that a computer system can include circuitry for receiving a request to write to the virtual disk extent; and circuitry for allocating an unused section of the virtual disk file to describe the virtual disk extent without modifying contents of the unused section of the virtual disk file based on the state information associated with the virtual disk extent, the state information indicating that the file system is securing access to the virtual disk extent. Referring again to FIG. 9 for context, virtual disk parser 404 can receive an IO job to write data to the virtual disk extent, e.g., virtual disk extent 4 of FIG. 9, which in this example is associated with state information that indicates that security for the virtual disk extent is being provided by file system 414. In response to detecting this state information, virtual disk parser 404 can identify an unused section of virtual disk file 702; write the payload of the IO job to the section; update state information to indicate that the virtual disk extent is mapped; and update information in allocation table 416 to describe the virtual disk file byte offset that identifies the beginning of the section used to store virtual disk extent 4.

Suppose that in this example the extent is a block and the payload for the IO job only covers a portion of the sectors in the virtual disk block. Specifically, the virtual disk block may be 512 kilobytes and the write may cover the first 500 sectors of the virtual disk block. In this example, virtual disk parser 404 can write data in the first 500 sectors of the allocated section of virtual disk file 702 without erasing the data stored in the remaining 524 sectors. Thus, if this section was examined one would find that the first 500 sectors include the payload and the remaining 524 sectors include whatever bit pattern was previously written to the section of virtual disk file 702. In this example, virtual disk parser 404 can use this section without clearing it because file system 414 is configured to deny read operations to sectors that are in file system free space. Since an application will be prevented from reading the remaining 524 sectors of virtual disk block, it can contain any data, which had previously been stored in the virtual disk.

Turning now to operation 1320 of FIG. 13, it shows that a computer system can be configured to include circuitry for receiving a request to write to the virtual disk extent; circuitry for logically overwriting an unused section of the virtual disk file with a non-information-disclosing bit pattern based on the state information associated with the virtual disk extent, the state information indicating that the file system is not securing access to the virtual disk extent; and circuitry for allocating the overwritten section of the virtual disk file to describe the virtual disk extent. Referring again to FIG. 9 for context, virtual disk parser 404 can receive a request to write data to the virtual disk extent, which in this example is associated with state information that indicates that file system 414 is not securing access to the virtual disk extent. For example, virtual disk parser 404 may have de-allocated the virtual disk extent in response to receipt of a standard TRIM command and could have stored state information indicating that virtual disk extent is unmapped, i.e., not backed by space in virtual disk file 702, in allocation table 416.

In response to determining that the virtual disk extent is unmapped, virtual disk parser 404 can identify an unused section of virtual disk file 702 to use to describe the virtual extent and logically write a non-information disclosing bit pattern to the section to ensure that reads to the virtual disk extent do not inadvertently reveal any information. In a preferred implementation, the non-information disclosing bit pattern could be all zeros or previously-stored data. After the section is zeroed or some other non-information disclosing bit pattern is logically written to the section such as previously-stored data, virtual disk parser 404 can logically write the payload of an IO job to the section; update state information to indicate that the virtual disk extent is mapped; and update information in allocation table 416 to describe the virtual disk file byte offset that identifies the beginning of the section used to store the virtual disk extent.

Continuing with the description of FIG. 13, operation 1322 shows that the computer system can include circuitry configured to send, based on state information indicating that the virtual disk extent was zeroed, a token representing zeros to a requestor in response to receipt of an offload read request associated with the virtual disk extent. For example, and referring to FIG. 4, offload provider engine 422, e.g., circuitry configured to service offload read and offload write commands, can send a token representing zeros to a requestor, e.g., application 424, in a response to an offload read request issued by the requestor. An offload read request can be used to efficiently copy data from one location to another by generating and sending tokens to requestors, the tokens representing the requested data instead of copying the data into the requestors' memory and then sending the data to the destination. Offload read and offload write commands can be used to achieve copy offload when the destination location recognizes the token generated by the source location and can logically write the data represented by the token to the destination. In the case of a well-known zero token generated by the source, the destination need not access the underlying storage, e.g., storage device 106, which could be a SAN target in this specific implementation. In this example, the offload read request can be to perform an offload read operation on one or more files that have data stored in one or more virtual disk extents, one of which is associated with state information indicating that the virtual disk extent is zeroed. In this example, the offload read request may be serviced by generating a well-known zero token value and returning that well-known zero token to the requestor.

The offload read request can be routed to offload provider engine 422. Offload provider engine 422 can receive the request and send a message to virtual disk parser 404 for the data stored in the virtual disk extents. Virtual disk parser 404 can receive the request, read the state information for the virtual disk extent, and determine, in this specific example, that the state information indicates that this virtual disk extent is zeroed. Virtual disk parser 404 can send a message back to offload provider engine 422 that indicates that the virtual disk extent is all zeros and offload provider engine 422 can generate a well-known token value that indicates that the requested data is all zeros, e.g., the range of sectors that describes a virtual disk block is all zeros, and send the well-known zero token to the requestor.

In a specific example, the offload request can be forward to a SAN instead of being processed by computer system 400, storage service 500, or computers system 512. In this example, the SAN may generate the token and return it back to virtual disk parser 404, which can then send the zero token to the requestor. In yet another example, when offload provider engine 422 receives the message that indicates that the virtual disk extent is all zeros, offload provider engine 422 can generate the well known-zero token, which in effect achieves logically copying the requested zero data into a separate area that is associated with the token by identifying the data as equivalent to any other zero data and sharing the area associated with the well-known zero token. In the instance that offload provider engine 422 subsequently receives an offload write specifying the token previously sent to the requestor, offload provider engine 422 can logically copy the data from the area associated with the token to offsets specified by the requestor.

Figure 14:
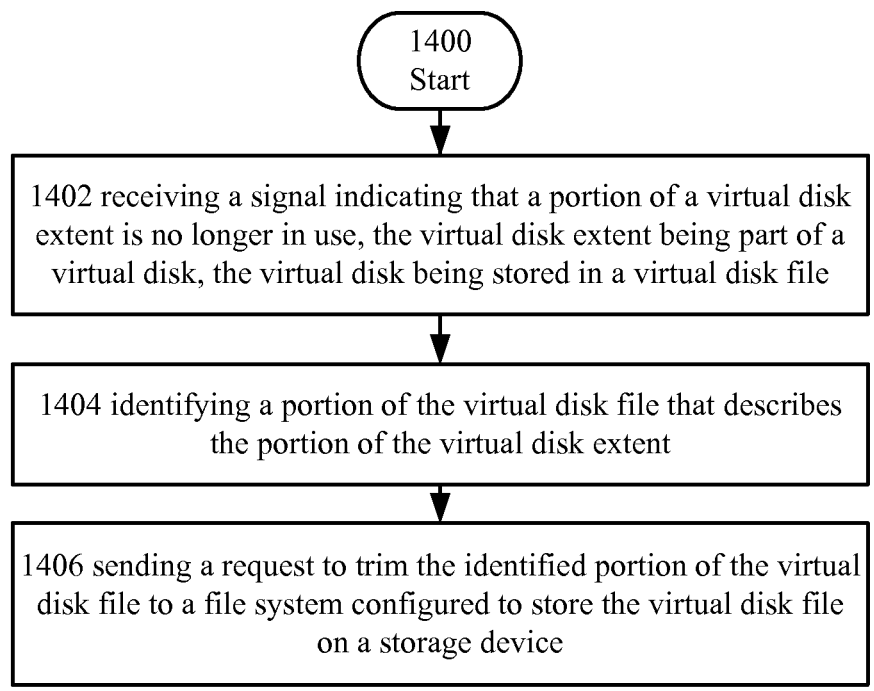
FIG. 14 depicts an operational procedure that can be implemented in a computer-readable storage medium and/or executed by a computer system.

Turning now to FIG. 14, it illustrates an operational procedure for reclaiming virtual disk file space including the operations 1400, 1402, 1404, and 1406. As shown by the figure, operation 1400 begins the operational procedure and operation 1402 shows that a computer system can include circuitry for receiving a signal indicating that a portion of a virtual disk extent is no longer in use, the virtual disk extent being part of a virtual disk, the virtual disk being stored in a virtual disk file. For example, and turning to FIG. 4, virtual disk parser 404 can be configured to instantiate virtual disk 402. File system 414 can send a signal indicating that it is no longer using a portion of virtual disk 402, e.g., a range of sectors of a virtual disk extent, to virtual disk parser 404. In a specific example, the signal could be a TRIM command. In a specific example, the signal received by virtual disk parser 404 could identify byte offset values that define a range of sectors that it is no longer using, which could be the first part of a virtual disk extent.

Continuing with the description of FIG. 14, operation 1404 shows that the computer system can also include circuitry configured to identify a portion of the virtual disk file that describes the portion of the virtual disk extent. Referring back to FIG. 7, virtual disk parser 404 can receive the signal and the virtual disk byte offset values that identify, for example, the first portion of virtual disk extent 0. In response to receipt of the signal, virtual disk parser 404 can check allocation table 416 to determine the portion of virtual disk file 702 that corresponds to the virtual disk byte offset values associated with the signal.

Turning now to operation 1406 of FIG. 14, it shows that the computer system can include circuitry for sending a request to trim the identified portion of the virtual disk file to a file system configured to store the virtual disk file on a storage device. For example, and again referring to FIG. 7, virtual disk parser 404 can determine that the signal identified less than the entire virtual disk extent. For example, the signal may indicate a range of sectors that does not include all of the sectors of a virtual disk extent. In response to this determination, virtual disk parser 404 can issue a request to trim the portion of virtual disk file 702 that corresponds to the trimmed portion of the virtual disk extent to a file system hosting virtual disk file 702, e.g., virtualization system file system 408. Virtualization system file system 408 may be configured to use the trim command and benefit from it by trimming virtual disk file 406, flushing data from a cache, clearing internal buffers, sending the trim to the disk on which the file system data is stored, etc.

In a specific example, virtual disk parser 404 can be configured to issue the TRIM command to the underlying file system in response to determining that the request to trim a portion of the virtual disk file does not cover the entire extent. For example, suppose that the signal identifies that the first 600 sectors of a virtual disk extent are no longer in use and virtual disk parser 404 may determine that the 600 sectors of virtual disk extent are less than the 1024 sectors that constitute the virtual disk extent. In response to this determination, virtual disk parser 404 can access allocation table 416 and determine the virtual disk file byte offsets that describe the first 600 sectors of the section of virtual disk file 702 that describes the virtual disk extent and send a request to trim this part of virtual disk file 702 to a file system that hosts virtual disk file 702.

Figure 15:
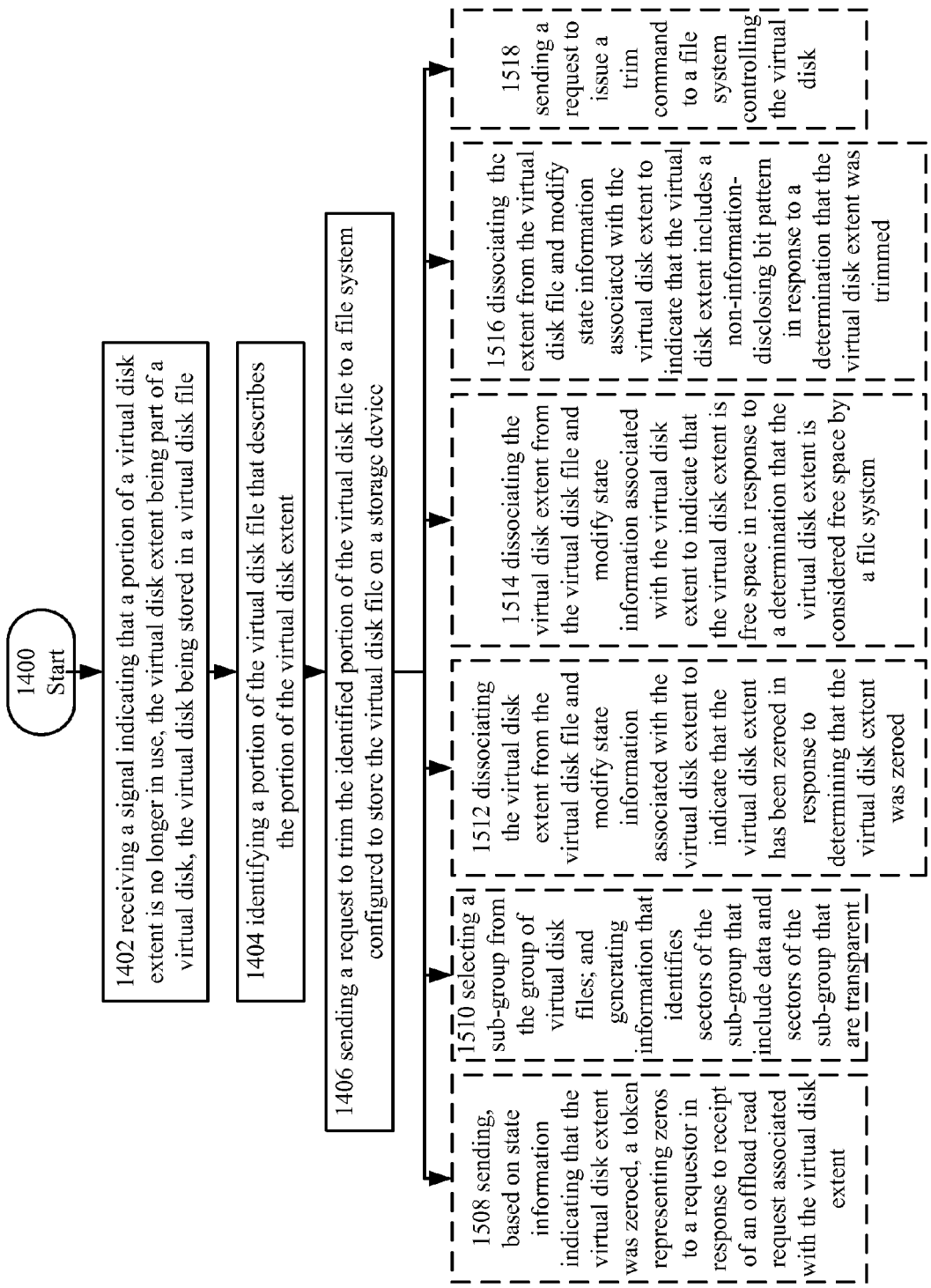
FIG. 15 depicts additional operations that can be executed in conjunction with those illustrated by FIG. 14.

Turning now to FIG. 15, it illustrates additional operations that can be executed in conjunction with those depicted by FIG. 14. Turning now to operation 1508, it shows that the computer system can additionally include circuitry for sending, based on state information indicating that the virtual disk extent was zeroed, a token representing zeros to a requestor in response to receipt of an offload read request associated with the virtual disk extent. For example, and referring to FIG. 4, offload provider engine 422, e.g., circuitry configured to service offload read and offload write commands, can send a token representing zeros to a requestor, e.g., application 424, in a response to an offload read request issued by the requestor. An offload read request can be used to efficiently copy data from one location to another by generating and sending tokens to requestors, the tokens representing the requested data instead of copying the data into the requestors' memory and then sending the data to the destination. Offload read and offload write commands can be used to achieve copy offload when the destination location recognizes the token generated by the source location and can logically write the data represented by the token to the destination. In the case of a well-known zero token generated by the source, the destination need not access the underlying storage, e.g., storage device 106, which could be a SAN target in this specific implementation. In this example, the offload read request can be to perform an offload read operation on one or more files that have data stored in one or more virtual disk extents, one of which is associated with state information indicating that the virtual disk extent is zeroed. In this example, the offload read request may be serviced by generating a well-known zero token value and returning that well-known zero token to the requestor.

Continuing with the description of FIG. 15, operation 1510 shows that the computer system can include circuitry for selecting a sub-group from the group of virtual disk files; and circuitry for generating information that identifies sectors of the sub-group that include data and sectors of the sub-group that are transparent. In an exemplary embodiment, virtual disk 402 can be instantiated from a plurality of virtual disk files. Or put another way, virtual disk 402 can be formed from M virtual disk files (where M is an integer greater than 1). In this exemplary embodiment, virtual disk parser 404 can be configured to receive a request from, for example, an administrator, to determine the next byte offset on virtual disk 402, starting at a given byte offset, that is associated with a sector defined within a subgroup of the virtual disk files. For example, and referring to FIG. 10, virtual disk parser 404 may receive a request for the next defined byte offset starting at the virtual disk offset corresponding to the first sector of virtual disk extent 2 and information indicating that the subgroup includes virtual disk file 1002 and virtual disk file 1004. In this example, virtual disk parser 404 can start scanning through subgroup and determine that the next defined byte offset is the sector that corresponds to the beginning of virtual disk extent 3. Since in this example, the data in virtual disk extent 2 is backed by a section of virtual disk file 1006 it is outside of the search and is not returned as being defined.

Continuing with the description of FIG. 15, operation 1512 shows that the computer system can include circuitry configured to dissociate the virtual disk extent from the virtual disk file and modify state information associated with the virtual disk extent to indicate that the virtual disk extent has been zeroed in response to determining that the virtual disk extent was zeroed. For example, and turning to FIG. 7, in an embodiment virtual disk parser 404 can determine that the virtual disk extent has been zeroed. For example, virtual disk parser 404 can receive a request to write data represented by a well-known zero token to the virtual disk extent, e.g., virtual disk extent 7. Virtual disk parser 404 can determine from a data structure associated with the request that the request is for the entire virtual disk extent, i.e., the byte offset values can start at the first sector of extent 7 and end at the last sector of extent 7. In response to such a determination, and instead of writing the zeros to the corresponding section of virtual disk file 702, virtual disk parser 404 can be configured to remove the link that maps virtual disk extent 7 to a section of virtual disk file 702 used to describe virtual disk extent 7 and associate the virtual disk extent with information that indicates that the virtual disk extent is all zeros. For example, virtual disk parser 404 can write eight bytes of information in allocation table 416 that indicates that the virtual disk extent includes all zeros. The end result of this operation is that the section of virtual disk file 702 can be reused to store data for other virtual disk extents and the virtual disk extent will read as if it includes all zeros, even though no portion of the virtual disk file is describing the extent on a bit-for-bit basis.

Continuing with the description of FIG. 15, operation 1514 shows that the computer system can additionally include circuitry configured to dissociate the virtual disk extent from the virtual disk file and modify state information associated with the virtual disk extent to indicate that the virtual disk extent is free space in response to a determination that the virtual disk extent is considered free space by a file system. For example, and again turning to FIG. 7, virtual disk parser 404 can determine that file system 414 has associated the virtual disk extent with information that indicates that it is free space, i.e., space that is not used by file system 414. For example, virtual disk parser 404 can receive a signal from file system 414 indicating a range of sectors that covers the virtual disk extent, e.g., virtual disk extent 3, and information that indicates that the sectors are considered to be free space. In response to receipt of such a signal, virtual disk parser 404 can be configured to remove information that links the virtual disk extent to a section of virtual disk file 702. The result of this operation is that the section of virtual disk file 702 can be reused to store data for other virtual disk extents. Virtual disk parser 404 can additionally associate the virtual disk extent with information that indicates that the virtual disk extent includes arbitrary data, i.e., data previously stored in any part of the virtual disk, all zeros, or all ones. Consequently, read operations directed to this virtual disk extent can be handled by returning arbitrary data which was previously stored in the virtual disk. In addition, the arbitrary data can optionally change each time a read operation is received, if the virtual disk parser 404 is configured to allow the arbitrary data to change each time a read operation is received.

Continuing with the description of FIG. 15, operation 1516 shows that the computer system can additionally include circuitry configured to dissociate the extent from the virtual disk file and modify state information associated with the virtual disk extent to indicate that the virtual disk extent includes a non-information-disclosing bit pattern in response to a determination that the virtual disk extent was trimmed. For example, and again turning to FIG. 7, virtual disk parser 404 can determine that file system 414 has trimmed a range of sectors that compose a virtual disk extent. In response to such a determination, virtual disk parser 404 can remove information in allocation table 416 that links the virtual disk extent to a section of virtual disk file 702. The result of this operation is that the section of virtual disk file 702 can be reused to store data for other virtual disk extents. Virtual disk parser 404 can additionally associate the virtual disk extent with information that indicates that the virtual disk extent includes a non-information-disclosing bit pattern, e.g., all zeros, ones, or a randomly generated bit pattern. Consequently, read operations directed to this virtual disk extent can be handled by returning the non-information-disclosing bit pattern. In a specific preferred implementation, the non-information-disclosing bit pattern can be all zeros. However, this is different than the zero state described above in that the zero state can be used to represent meaningful zeros, i.e., the instance where the virtual disk extent was intentionally zeroed.

Referring to operation 1518, it shows that the computer system can additionally include circuitry configured to send a request to issue a trim command to a file system controlling the virtual disk. Referring back to FIG. 7, virtual disk parser 404 can be configured to issue a request that file system 414 issue one or more TRIM commands. In an exemplary configuration, virtual disk parser 404 can be configured to periodically send such a request or to send such a request based on predetermined criteria, e.g., when VM 410 starts or shortly before the VM is to be shut down. In response to such a request, file system 414 can issue one or more TRIM commands that identify the unused sectors of virtual disk 402 to virtual disk parser 404. Virtual disk parser 404 may then receive trim information from the TRIM commands such as the range of sectors that are no longer in use by file system 414 and optionally information that indicates whether the trimmed sectors are considered free space. Virtual disk parser 404 can receive the information and use it to update state information stored in allocation table 416 and to possibly reclaim unused sections of virtual disk file 702.

Figure 16:
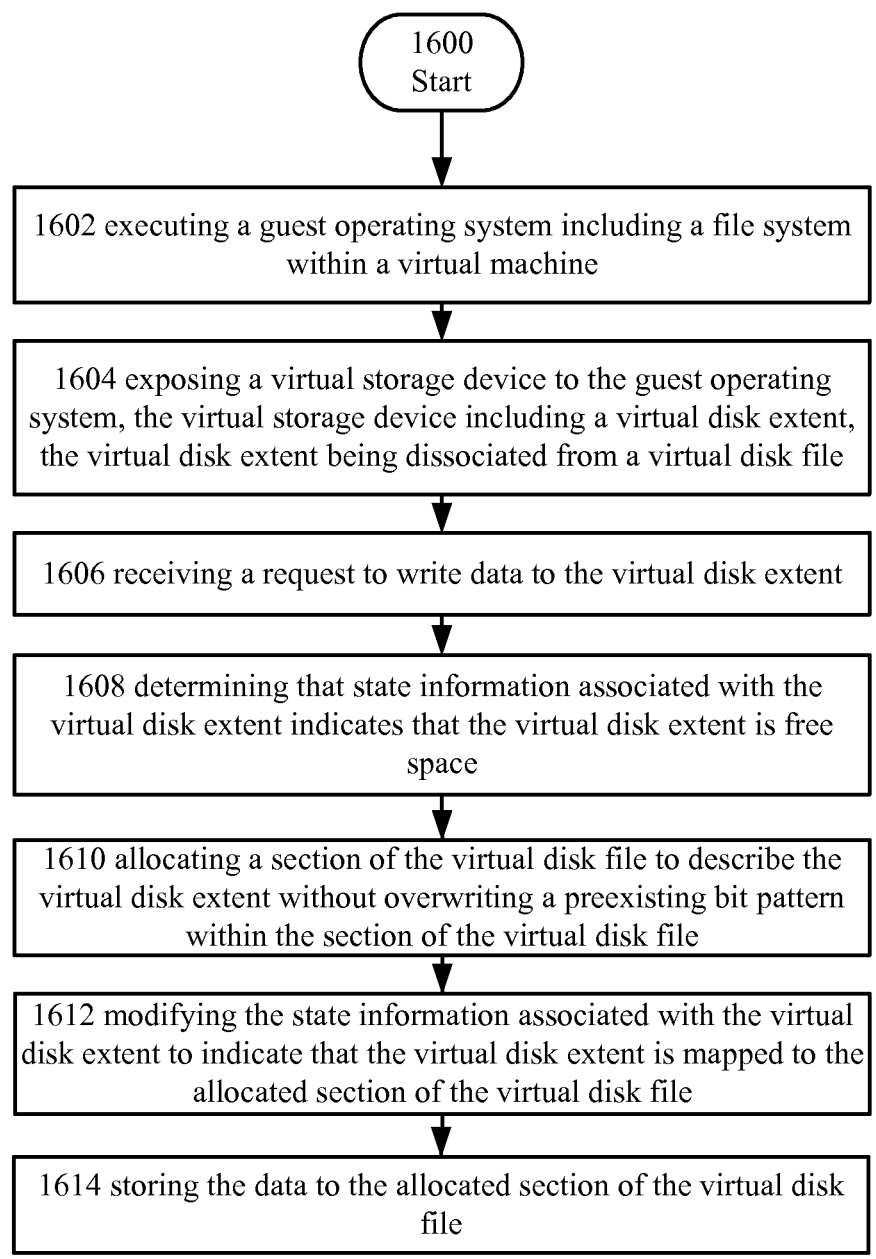
FIG. 16 depicts an operational procedure that can be implemented in a computer-readable storage medium and/or executed by a computer system.

Turning now to FIG. 16, it illustrates an operational procedure for storing data for a virtual machine. The operational procedure begins with operation 1600 and transitions to operation 1602, which describes an instance where a computer system can include circuitry for executing a guest operating system including a file system within a virtual machine. For example, and referring to FIG. 4, virtualization system 420, which could be hypervisor 302 of FIG. 3 or the combination of functions executed by host environment 204 and microkernel hypervisor 202 of FIG. 2, can instantiate virtual machine 410 and run a guest operating system (such as guest operating system 412) within it. In this example, guest operating system 412 can include file system 414, which can be executable instructions that organize and control data for guest operating system 412.

Continuing with the description of FIG. 16, operation 1604 shows that the computer system can include circuitry for exposing a virtual storage device to the guest operating system, the virtual storage device including a virtual disk extent, the virtual disk extent being dissociated from a virtual disk file. Turning back to FIG. 4, virtualization system 420 can expose virtual disk 402 to guest operating system 412. For example, virtual disk parser 404 can be in communication with a storage virtualization service provider that is operable to communicate with a storage virtualization service client running within guest operating system 410. In a specific example, the storage virtualization service client could be a driver installed within guest operating system 412 that signals to the guest that it can communicate with a storage device. In this example, IO jobs sent by file system 414 are sent first to the storage virtualization service client and then to the storage virtualization service provider via a communication channel, e.g., a region of memory and cross-partition notification facility. Virtual disk 402 can be composed from one or more virtual disk files 406 that can be opened by virtual disk parser 404 and used to store data for virtual disk 402. In a specific example virtual disk 402 can be described at least in part by virtual disk file 702 of FIG. 7. In another specific example, and turning to FIG. 10, virtual disk 402 can be described by a group of virtual disk files (1002-1006). In either case, and returning to FIG. 4, virtual disk 402 can include a plurality of virtual disk extents and one of the virtual disk extents can dissociated, i.e., not described on a bit-for-bit basis by any space within its associated virtual disk file.

Continuing with the description of FIG. 16, operation 1606 shows that the computer system can include circuitry for receiving a request to write data to the virtual disk extent. Turing back to FIG. 7, virtual disk parser 404 can receive a request to write data to the virtual disk extent that has no associated space within virtual disk file 702. For example, an IO job can be received that specifies an offset value indicative of the address of a virtual disk sector, which is within the virtual disk extent.

Turning back to FIG. 16, operation 1608 shows that the computer system can optionally include circuitry for determining that state information associated with the virtual disk extent indicates that the virtual disk extent is free space. In response to receipt of the IO job, virtual disk parser 404 can access allocation table 416 and read state information associated with the virtual disk extent. In this example, the virtual disk extent may be associated with information that indicates that the virtual disk extent is free space, i.e., that file system 414 is not using the virtual disk extent and that read operations to the virtual disk extent can be answered with arbitrary data.

Referring to FIG. 16, operation 1610 shows that the computer system can optionally include circuitry for allocating a section of the virtual disk file to describe the virtual disk extent without overwriting a preexisting bit pattern within the section of the virtual disk file. For example, and returning to FIG. 7, in response to receipt of a write IO job, virtual disk parser 404 can locate a section in virtual disk file 702 that is not being used and allocate it to store data for the virtual extent. For example, virtual disk parser 404 can write information in allocation table 416 that links the virtual disk extent to byte offset values of the allocated section of virtual disk file 702.

In this example, virtual disk parser 404 may not overwrite any bit pattern existing within the section, e.g., data from some deleted file and/or arbitrary data, stored in the section of virtual disk file 702 (by writing all zeros, ones, or any other non-information-disclosing bit pattern) prior to using the section to describe the virtual disk extent because state information indicates that file system 414 has identified virtual disk extent 5 as free space. This provides an added benefit of saving processor cycles and IO jobs that would be otherwise used to overwrite the section of the virtual disk extent.

Referring to operation 1612 of FIG. 16, it shows that the computer system can optionally include circuitry for modifying the state information associated with the virtual disk extent to indicate that the virtual disk extent is mapped to the allocated section of the virtual disk file. For example, and turning back to FIG. 7, virtual disk parser 404 can modify, e.g., overwrite in memory, the state information associated with the virtual disk extent to indicate that it is mapped. Consequently, subsequent read operations directed to sectors of the virtual disk extent will be handled by virtual disk parser 404 by returning the bit pattern stored in corresponding portions of the allocated section.

Turning now to operation 1614 of FIG. 16, it shows storing the data to the allocated section of the virtual disk file. Turning back to FIG. 6, virtual disk parser 404 can write the data, e.g., a bit pattern, into virtual disk file 702. An IO job indicative of the write to virtual disk file 702 can be issued to virtualization system file system 408 and eventually the change can be persisted by persistent storage unit 460.

Figure 17:
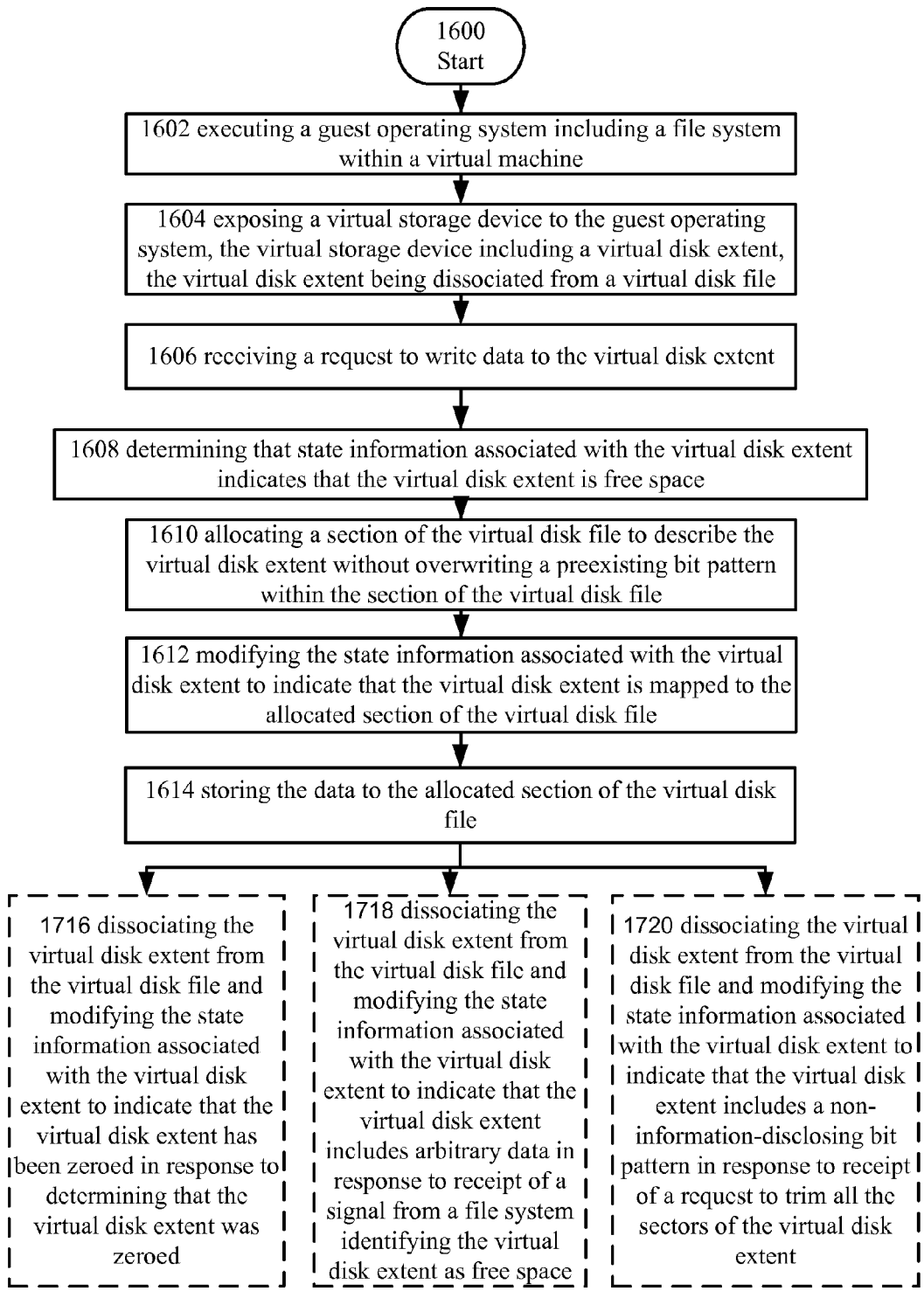
FIG. 17 depicts additional operations that can be executed in conjunction with those illustrated by FIG. 16.

Turning now to FIG. 17, it shows additional operations that can be executed in conjunction with those illustrated by FIG. 16. Turning attention to operation 1716, it shows that the computer system can optionally include circuitry for dissociating the virtual disk extent from the virtual disk file and modifying the state information associated with the virtual disk extent to indicate that the virtual disk extent has been zeroed in response to determining that the virtual disk extent was zeroed. For example, and turning to FIG. 6, in an embodiment virtual disk parser 404 can determine that the virtual disk extent has been zeroed. For example, virtual disk parser 404 can receive an offload write request to write data represented by a well-known zero token to the virtual disk extent, e.g., virtual disk extent 7. Virtual disk parser 404 can determine from a data structure associated with the request that the request is for the entire virtual disk extent, i.e., the byte offset values can start at the first sector of virtual disk extent 7 and end at the last sector of virtual disk extent 7. In response to such a determination, and instead of writing the zeros to the corresponding section of virtual disk file 702, virtual disk parser 404 can be configured to remove the link from the virtual disk extent to a section of virtual disk file 702 stored in allocation table 416 and associate the virtual disk extent with information that indicates that the virtual disk extent is all zeros.

Continuing with the description of FIG. 17, operation 1718 shows that the computer system can optionally include circuitry for dissociating the virtual disk extent from the virtual disk file and modifying the state information associated with the virtual disk extent to indicate that the virtual disk extent includes arbitrary data in response to receipt of a signal from a file system identifying the virtual disk extent as free space. For example, and again turning to FIG. 7, virtual disk parser 404 can determine that file system 414 has associated the virtual disk extent with information that indicates that it is free space, i.e., space that is not used by file system 414. For example, virtual disk parser 404 can receive a signal from file system 414 indicating a range of sectors that covers the virtual disk extent, e.g., virtual disk extent 3, and information that indicates that the sectors are free space. In response to such a determination, virtual disk parser 404 can be configured to remove information in allocation table 416 that links the virtual disk extent to a section of virtual disk file 702 and associate the virtual disk extent with information that indicates that arbitrary data, i.e., data previously stored in any part of the virtual disk, all zeros, or all ones, can be returned in response to receipt of a read IO job.

Operation 1720 of FIG. 17 shows that computer system 400 can optionally include circuitry for dissociating the virtual disk extent from the virtual disk file and modifying the state information associated with the virtual disk extent to indicate that the virtual disk extent includes a non-information disclosing bit pattern in response to receipt of a request to trim all the sectors of the virtual disk extent. For example, and again turning to FIG. 7, virtual disk parser 404 can determine that the sectors that compose a virtual disk extent have been trimmed. For example, virtual disk parser 404 can receive a trim command from file system 414 indicating a range of sectors that covers the virtual disk extent. In response to receipt of such a signal, virtual disk parser 404 can be configured to remove information in allocation table 416 that links the virtual disk extent to a section of virtual disk file 702 and associate the virtual disk extent with information that indicates that the virtual disk extent includes a non-information-disclosing bit pattern.

The foregoing detailed description has set forth various embodiments of the systems and/or processes via examples and/or operational diagrams. Insofar as such block diagrams, and/or examples contain one or more functions and/or operations, it will be understood by those skilled in the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A storage device comprising computer executable instructions that upon execution by a processor cause the processor to:
   instantiate a virtual disk including a virtual disk extent, the virtual disk extent being dissociated from a virtual disk file;
   allocate, based on state information associated with the virtual disk, a section of the virtual disk file to describe the virtual disk extent without overwriting a preexisting bit pattern within the section of the virtual disk file; and
   modify the state information associated with the virtual disk extent to indicate that the virtual disk extent is described by the virtual disk file.

2. The storage device of claim 1, further comprising instructions that upon execution cause the processor to:
   respond to an offset query command with information that identifies sectors of the virtual disk that are non-zero, sectors of the virtual disk that are in a non-transparent state, sectors of the virtual disk that are in a mapped state, and/or sectors of the virtual disk that are in an initialized state.

3. The storage device of claim 1, further comprising instructions that upon execution cause the processor to:
   send a request to a file system controlling the virtual disk file to issue at least one command selected from a group of commands including a trim command, an unmap command, a write same of zero command, and an offload write of a zero token command.

4. The storage device of claim 1, further comprising instructions that upon execution cause the processor to:
   determine a portion of the virtual disk file that corresponds to a portion of a second virtual disk extent in response to receipt of a request to trim a portion of the second virtual disk extent; and
   send a trim command for the determined portion of the virtual disk file to a file system configured to store the virtual disk file on a storage device.

5. The storage device of claim 1, further comprising instructions that upon execution cause the processor to:
   dissociate the virtual disk extent from the section of the virtual disk file and modify the state information associated with the virtual disk extent to indicate that the virtual disk extent has no associated space in the virtual disk file in response to receipt of a request to trim a range of sectors that covers the virtual disk extent.

6. The storage device of claim 5, further comprising instructions that upon execution cause the processor to:
   receive a request to write data to the virtual disk extent;
   zero an unused section of the virtual disk file based on the state information associated with the virtual disk extent, the state information indicating that the virtual disk extent was zeroed; and
   allocate the unused section of the virtual disk file to describe the virtual disk extent.

7. The storage device of claim 5, further comprising instructions that upon execution cause the processor to:
   receive a request to write to the virtual disk extent; and
   allocate an unused section of the virtual disk file to describe the virtual disk extent without modifying contents of the unused section of the virtual disk file based on the state information associated with the virtual disk extent, the state information indicating that the file system is securing access to the virtual disk extent.

8. The storage device of claim 5, further comprising instructions that upon execution cause the processor to:
   receive a request to write to the virtual disk extent;
   overwrite an unused section of the virtual disk file with a non-information-disclosing bit pattern based on the state information associated with the virtual disk extent, the state information indicating that the file system is not securing access to the virtual disk extent; and
   allocate the overwritten section of the virtual disk file to describe the virtual disk extent.

9. The storage device of claim 5, further comprising instructions that upon execution cause the processor to:
   send, based on state information indicating that the virtual disk extent was zeroed, a token representing zeros to a requestor in response to receipt of an offload read request associated with the virtual disk extent.

10. A computer system, comprising:
    a processor;
    a memory coupled to the processor when the processor and the memory are powered, the memory including instructions that upon execution by the processor cause the computer system to:
    receive a signal indicating that a portion of a virtual disk extent is no longer in use, the virtual disk extent being part of a virtual disk, the virtual disk being stored in a virtual disk file;
    identify a portion of the virtual disk file that describes the portion of the virtual disk extent; and
    send a request to trim the identified portion of the virtual disk file to a file system configured to store the virtual disk file on a storage device.

11. The computer system of claim 10, the memory further comprising instructions that upon execution cause the computer system to:

send, based on state information indicating that the virtual disk extent was zeroed, a token representing zeros to a requestor in response to receipt of an offload read request associated with the virtual disk extent.

12. The computer system of claim 10, the virtual disk file being a member of a group of virtual disk files that together form a virtual disk that includes the virtual disk extent and the memory further comprising instructions that upon execution cause the computer system to:

select a sub-group from the group of virtual disk files; and
generate information that identifies sectors of the sub-group that include data and sectors of the sub-group that are transparent.

13. The computer system of claim 10, the memory further comprising instructions that upon execution cause the computer system to:

dissociate the virtual disk extent from the virtual disk file and modify state information associated with the virtual disk extent to indicate that the virtual disk extent has been zeroed in response to determining that the virtual disk extent was zeroed.

14. The computer system of claim 10, the memory further comprising instructions that upon execution cause the computer system to:

dissociate the virtual disk extent from the virtual disk file and modify state information associated with the virtual disk extent to indicate that the virtual disk extent is free space in response to a determination that the virtual disk extent is considered free space by a file system.

15. The computer system of claim 10, the memory further comprising instructions that upon execution cause the computer system to:

dissociate the extent from the virtual disk file and modify state information associated with the virtual disk extent to indicate that the virtual disk extent includes a non-information-disclosing bit pattern in response to a determination that the virtual disk extent was trimmed.

16. The computer system of claim 10, the memory further comprising instructions that upon execution cause the computer system to:

send a request to issue a trim command to a file system controlling the virtual disk.

17. A computer implemented method for storing data for a virtual machine, comprising:

executing a guest operating system including a file system within a virtual machine;
exposing a virtual storage device to the guest operating system, the virtual storage device including a virtual disk extent, the virtual disk extent being dissociated from a virtual disk file;
receiving a request to write data to the virtual disk extent;
determining that state information associated with the virtual disk extent indicates that the virtual disk extent is free space;
allocating a section of the virtual disk file to describe the virtual disk extent without overwriting a preexisting bit pattern within the section of the virtual disk file;
modifying the state information associated with the virtual disk extent to indicate that the virtual disk extent is mapped to the allocated section of the virtual disk file; and
storing the data to the allocated section of the virtual disk file.

18. The method of claim 17, further comprising
dissociating the virtual disk extent from the virtual disk file and modifying the state information associated with the virtual disk extent to indicate that the virtual disk extent has been zeroed in response to determining that the virtual disk extent was zeroed.

19. The method of claim 17, further comprising
dissociating the virtual disk extent from the virtual disk file and modifying the state information associated with the virtual disk extent to indicate that the virtual disk extent includes arbitrary data in response to receipt of a signal from a file system identifying the virtual disk extent as free space.

20. The method of claim 17, further comprising
dissociating the virtual disk extent from the virtual disk file and modifying the state information associated with the virtual disk extent to indicate that the virtual disk extent includes a non-information disclosing bit pattern in response to receipt of a request to trim all the sectors of the virtual disk extent.

* * * * *